US007004905B2

(12) United States Patent
Christopher

(10) Patent No.: US 7,004,905 B2
(45) Date of Patent: Feb. 28, 2006

(54) FINITE AMPLITUDE DISTORTION-BASED INHOMOGENEOUS PULSE ECHO ULTRASONIC IMAGING

(75) Inventor: Ted Christopher, Rochester, NY (US)

(73) Assignee: Research Corporation Technologies, Inc., Tucson, AZ (US)

( * ) Notice: Subject to any disclaimer, the term of this patent is extended or adjusted under 35 U.S.C. 154(b) by 122 days.

(21) Appl. No.: 10/806,925

(22) Filed: Mar. 23, 2004

(65) Prior Publication Data
US 2004/0249280 A1 Dec. 9, 2004

Related U.S. Application Data

(63) Continuation of application No. 08/746,360, filed on Nov. 8, 1996.

(51) Int. Cl.
A61B 8/00 (2006.01)

(52) U.S. Cl. ...................................................... 600/443
(58) Field of Classification Search ......... 600/437–472; 73/625, 626; 128/916; 367/7, 11, 130, 138
See application file for complete search history.

(56) References Cited

U.S. PATENT DOCUMENTS

| 4,012,950 | A | 3/1977 | Kompfner et al. |
| 4,483,345 | A | 11/1984 | Miwa |
| 4,610,255 | A | 9/1986 | Shimura et al. |
| 4,620,546 | A | 11/1986 | Aida |
| 4,702,258 | A | 10/1987 | Nicolas et al. |
| 4,714,846 | A | 12/1987 | Pesque et al. |
| 4,865,042 | A | 9/1989 | Umemura et al. |

(Continued)

FOREIGN PATENT DOCUMENTS

| EP | 226044 | 6/1987 |
| EP | 0770 352 A1 | 5/1997 |
| EP | 851 241 A2 | 7/1998 |
| JP | 8-294487 | 11/1996 |
| WO | WO 8002365 | 11/1980 |
| WO | WO 96/13213 | 5/1996 |
| WO | WO 91/15999 | 10/1999 |

OTHER PUBLICATIONS

Averkiou, et al., (1995), "Measurements of Harmonic Generation in a Focused Finite–Amplitude Sound Beam", *J. Acoust. Soc. Am.* 98(6), pp. 3439–3442.

Baker, et al., (1997), "Nonlinear Propagation Applied to the Improvement of Resolution in Diagnostic Medical Ultrasound", *J. Acoust. Soc. Am.* 101(1):143–154.

Baker, et al., (1995), "Non–Linear Propagation Applied To The Improvement of Lateral Resolution In Medical Ultrasound Scanners", 1995 World Congress On Ultrasonics, pp. 965–968.

Baker, et al., (1988), "The Nonlinear Pressure Field of a Plane Circular Piston: Theory and Experiment", *J. Acoust. Soc. Am.* 84(4).

(Continued)

*Primary Examiner*—Ali Imam
(74) *Attorney, Agent, or Firm*—Scully, Scott Murphy & Presser

(57) ABSTRACT

A method and system for imaging a sample. The method includes the steps of generating an ultrasonic signal, directing the signal into a sample, which signal is distorted and contains a first order and higher order component signals at first and higher frequencies respectively. The received distorted signal is processed, and an image is formed, and then displayed, from one of the higher order component signals of the received distorted signal.

26 Claims, 23 Drawing Sheets

U.S. PATENT DOCUMENTS

| | | | |
|---|---|---|---|
| 5,034,931 | A | 7/1991 | Wells |
| 5,111,823 | A | 5/1992 | Cohen |
| 5,158,071 | A | 10/1992 | Umemura et al. |
| 5,255,683 | A | 10/1993 | Monaghan |
| 5,313,948 | A | 5/1994 | Murashita et al. |
| 5,396,285 | A | 3/1995 | Hedberg et al. |
| 5,410,516 | A | 4/1995 | Uhlrndorf et al. |
| 5,415,175 | A | 5/1995 | Hanafy et al. |
| 5,435,311 | A | 7/1995 | Umemura et al. |
| 5,456,257 | A | 10/1995 | Johnson et al. |
| 5,526,816 | A | 6/1996 | Arditi |
| 5,540,909 | A | 7/1996 | Schutt |
| 5,577,505 | A | 11/1996 | Brock-Fisher et al. |
| 5,608,690 | A | 3/1997 | Hossack et al. |
| 5,628,320 | A | 5/1997 | Teo |
| 5,628,322 | A | 5/1997 | Mine |
| 5,632,277 | A | 5/1997 | Chapman et al. |
| 5,706,819 | A | 1/1998 | Hwang et al. |
| 5,724,976 | A | 3/1998 | Mine |
| 5,740,128 | A | 4/1998 | Hossack et al. |
| 5,833,613 | A | 11/1998 | Averkiou et al. |
| 5,833,614 | A | 11/1998 | Dodd et al. |
| 5,846,202 | A | 12/1998 | Ramamurthy et al. |
| 5,879,303 | A | 3/1999 | Averkiou et al. |
| 5,897,500 | A | 4/1999 | Zhao |
| 6,023,977 | A | 2/2000 | Langdon et al. |

OTHER PUBLICATIONS

Bjorno L. et al., (1982), "Nonlinear Focusing Effects in Ultrasonic Imaging", Ultrasonics Symposium Proceedings, vol. 2:659–662.

Chang, et. al., (1994), "Second Harmonic Imaging and Harmonic Doppler Measurements with Albunex", 1994 Ultrasonics Symposium, pp. 1551–1554.

"Errors in Attenuation Measurements Due to Nonlinear Propagation Effect," Zeqiri, *J. Acoust. Soc. Am.* 91 (5), pp . 2585–2593, May 1992.

"Harmonic Generation in Finite Amplitude Sound Beams from a Rectangular Aperture Source," Kamakura, et al., *J. Acoust. Soc. Am.* 91 (6), pp. 3144–3151, Jun. 1992.

"The Enhancement of Second Harmonic Generation In Ultrasonic Microscopic Observation By Triple Transition," Din, et al., 1993 *Ultrasonic Symposium*, pp. 575–578.

"Non–Linearity and Finite Amplitude Effects," *European Journal Of Ultrasound*, 1 pp. 215–219, 1994.

"Time–Shift Compensation of Ultrasonic Pulse Focus Degradation using Least–Mean–Square Error Estimates of Arrival Time," Liu, et al., *The Journal of the Acoustical Society of America*, vol. 95, No. 1, pp. 542–555, Jan. 1994.

"Adaptive Focusing in Scattering Media through Sound-Speed Inhomogeneities: The van Cittert Zernike Approach and Focusing Criterion," Mallert, et al., *J. Acoust. Soc. Am.*, 96 (6), pp. 3721–3732, Dec. 1994.

"Wavefront Amplitude Distribution in the Female Breast," Zhu, et al., *J. Acoust. Soc. Am.*, 96 (1), pp. 1–9, Jul. 1994.

"An Experimental Investigation of the Nonlinear Pressure Field Produced by a Plane Circular Piston," TenCate, *J. Acoust. Soc. Am.* 94 (2), Pt. 1, pp. 1084–1089, Aug. 1993.

"New Approaches to Nonlinear Diffractive Field Propagation," Christopher, et al., *J. Acoust. Soc. Am.* 90 (1), pp. 488–499, Jul. 1991.

"Imaging the Acoustic Nonlinearity Parameter with Finite–Amplitude Sound Waves: The Difference–Frequency Method and the Second–Harmonic Method," Y. Nakagawa, et al., *IEICE Transactions*, vol. E71, No. 8, pp. 799–809 Aug. 1988.

"Second Harmonic Imaging and Harmonic Doppler Measurements with Albunex," Chang, et al., *1994 Ultrasonics Symposium*, pp. 1551–1554.

"In Vivo and In Vitro Ultrasound Beam Distortion Measurements of a Large Aperture and a Conventional Aperture Focused Transducer," Moshfeghi, et al., *Ultrasound in Med and Biol.*, vol. 14, No. 5, pp. 415–428, 1988.

"Physical Acoustics: Ultrasonic Techniques," Makin, *J. Acoust. Soc. Am.* vol. 97, No. 5, Pt. 2, May 1995.

"Generation of Harmonics in a focused Gaussian sound field," Du, et al., *J. Acoust. Soc. Am.* 97 (3), pp. 1486–1488, Mar. 1995.

"Nonlinear Propagation in Doppler Ultrasound," McDicken, et al., *Ultrasound in Med & Biol.*, vol. 19, No. 5, pp. 359–364, 1993.

"Multi–Frequency Transducer Assembly for Nonlinear Ultrasonic Measurements," Wu, et al., *J. Acoust. Soc. Am.* 93 (4), Pt. 1, pp. 2231–2234.

Ward, B. et al., (1995) "Non–Linear Propagation Applied to the Improvement of Lateral Resolution in Medical Ultrasound Scanners," *1995 World Congress on Ultrasonics*, pp. 965–968.

Ward, B. et al. (1997) "Nonlinear Propagation Applied to the Improvement of Resolution in Diagnostic Medical Ultrasound", *J. Acoust. Soc. Am.* 101 (1): 143–154.

Fosberg, F. (1993) "In Vivo Application of Constrast–Enhanced Harmonic Imaging" *Radiological Society of North America*, Abstract No. 1047.

Parker, Kevin J., "Observations of Nonlinear Acoustic Effects in a B–Scan Imaging Instrument," *IEEE Transactions on Sonics and Ultrasonics*, vol. SU–32: No. 1 (1985).

Dunn, et al., (1981), "Ultrasonic Determination of the Nonlinearity Parameter B/A for Biological Media," *J. Acoust. Soc. Am.* 69(4), pp. 1210–1212.

"Modeling Acoustic Field Propagation for Medical Devices" (1993) PhD. Thesis by Dr. Ted Christopher.

J.Y. Chapelon et al., *Ultrasonics*, "Bubble Detection and Sizing with a Double Frequency Doppler System" vol. 26, May 1988, pp. 148–154.

D. Cathignol, et al., "Bubble Sizing with High Spatial Resolution" *IEEE Transactions on Ultrasonics*, Ferroelectrics and Frequency Control, vol. 37, No. 1, pp. 30–37, Jan. 1990.

D.L. Miller "Ultrasonic Detection of Resonant Caitation Bubbles in a Flow Tube by Their Second–Harmonic Emissions", *Ultrasonics*, vol. 19, pp. 217–224, Sep. 1981.

Schrope, B. et al. (1992) "Simulated Capillary Blood Flow Management Using a Nonlinear Ultrasonic Contrast Agent", *Ultrasonic Imaging*, vol. 14:134–158.

| On-axis Source intensity (RMS w/cm²) | Received 2nd harmonic level (dB) | Received 3rd harmonic level (dB) | Minimum pressure at the geometric focus (Mpa) | Mechanical Index (min. press.sqrt(f)) |
|---|---|---|---|---|
| 0.5 | 26.54 | 50.88 | -0.45 | 0.32 |
| 1 | 23.64 | 45.02 | -0.61 | 0.43 |
| 2 | 20.73 | 39.23 | -0.84 | 0.59 |
| 4 | 17.94 | 33.66 | -1.13 | 0.80 |
| 8 | 15.37 | 28.59 | -1.50 | 1.06 |

Figure 8

| Focal length (cm) | 2nd harmonic level at the focus (dB) | Received 2nd harmonic level (dB) |
|---|---|---|
| 4 | 15.99 | 19.75 |
| 6 | 15.11 | 20.73 |
| 8 | 15.01 | 22.53 |
| 10 | 15.29 | 24.69 |
| 12 | 15.83 | 27.07 |

Figure 9

| Frequency / Medium | -20 dB full-width(cm) | 0.9 Integrated full-width (cm) |
|---|---|---|
| 2 MHz / ab wall | 0.388 | 0.458 |
| 4 MHz / ab wall | 0.242 | 0.542 |
| 2$^{nd}$ har 4 MHz / ab wall | 0.258 | 0.332 |
| 8 MHz / ab wall | 0.304 | 0.602 |
| 2$^{nd}$ har 8 MHz / ab wall | 0.216 | 0.338 |
| 2 MHz / ab wall | 0.406 | 0.746 |
| 4 MHz / ab wall | 0.334 | 0.858 |
| 2$^{nd}$ har 4 MHz / ab wall | 0.308 | 0.504 |
| 8 MHz / ab wall | 0.462 | 0.880 |
| 2$^{nd}$ har 8 MHz / ab wall | 0.298 | 0.526 |

FINITE AMPLITUDE DISTORTION-BASED INHOMOGENEOUS PULSE ECHO ULTRASONIC IMAGING

CROSS REFERENCE OF RELATED APPLICATIONS

This application is a continuation of application U.S. Ser. No. 08/746,360, filed Nov. 8, 1996.

BACKGROUND OF THE INVENTION

This invention generally relates to ultrasonic pulse echo imaging, and more specifically, to ultrasonic pulse echo imaging based on the distortion of ultrasonic signals transmitted into samples.

Ultrasonic pulse echo imaging is widely used in many medical applications. While this technique has received wide acceptance, it would be desirable to improve the resolution of the images formed from this technique. For example, ultrasonic pulse echo imaging in inhomogeneous media suffers from significant lateral and contrast resolution losses due to the defocusing effects of the inhomogeneities of the media. The losses in lateral and contrast resolution are associated with increases in the width of the main beams and increases in side lobe levels, respectively.

These two forms of resolution loss represent a significant hurdle to improving the clinical utility of biomedical ultrasonic imaging. A number of research efforts are currently underway to investigate the defocusing effects of tissue and to consider corrective measures. These efforts, however, generally assume linear propagation and base the image-formation process on the reception of the transmitted pulse.

SUMMARY OF THE INVENTION

An object of this invention is to improve ultrasonic imaging and methods.

Another object of the present invention is to improve the resolution of images formed from ultrasonic echo signals.

A further object of this invention is to utilize the enhanced inhomogeneous focusing properties of the finite amplitude distortion generated higher harmonics of an ultrasonic imaging beam in order to obtain improved contrast resolution and lateral resolution images.

These and other objectives are obtained with a method and system for imaging a sample. The method includes the steps of generating an ultrasonic signal, directing the signal into a sample, which signal is distorted and contains a first order and higher order component signals at first and higher frequencies respectively. The received distorted signal is processed, and an image is formed, and then displayed, from one of the higher order component signals of the received distorted signal.

With the preferred embodiment of the invention disclosed herein in detail, the ultrasonic image is based on one of the received finite amplitude distortion component (or nonlinearly-generated higher harmonics) associated with the transmitted signal. In the simplest case, in which the transducer emits negligible energy in the second harmonic bandwidth, such an image can be formed by adding an initial high pass filtering of the received signal. In general, such an image can be formed by using a two pulse transmit, receive, normalize, and then high pass filtering scheme. Such a two pulse scheme can be used to remove the source or linear content in the second and higher harmonic bandwidths.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 6b illustrates the corresponding spectrums of the source and focal planes shown in FIG. 6a.

FIG. 8 is a table giving the on-axis source plane intensity versus the received second and third harmonic levels and focal field parameters.

FIG. 9 is a Table providing focal and received second harmonic levels versus focal length.

FIG. 17 is a table giving the −20 dB full-widths for the average two-way profiles shown in FIGS. 14a, 15a and 16a and the full-widths at the 0.9 level for the integrated profiles of FIGS. 14b, 15b and 16b. Also shown are the corresponding results from the 8 MHz breast jittered propagations.

FIG. 19b shows the resulting difference spectrum computed for the two-spectrum shown in FIG. 19a.

DETAILED DESCRIPTION OF THE PREFERRED EMBODIMENT

Figure 1:
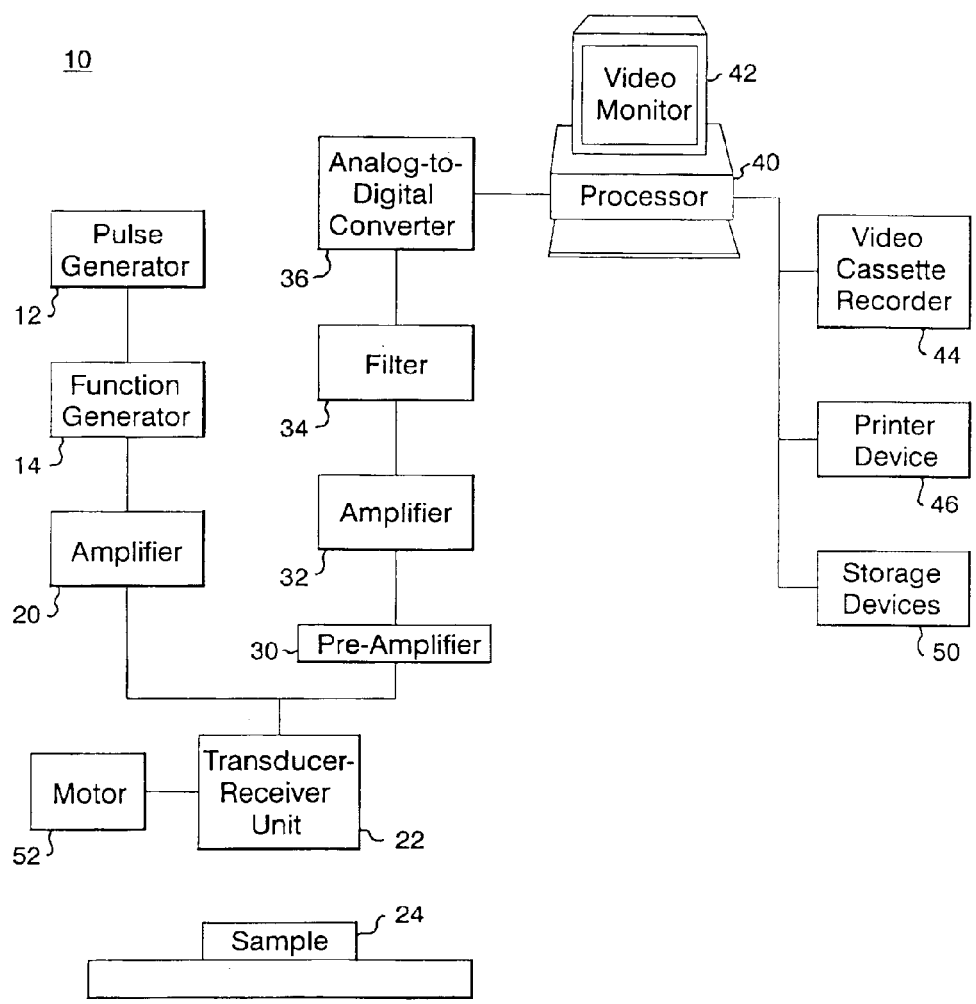
FIG. 1 shows an ultrasonic imaging system embodying the present invention.

FIG. 1 illustrates ultrasonic imaging system 10. A pulse generator 12 and a function generator 14 produce a sinusoidal pulse ultrasonic signal of, for example, 2.0 MHz at a pulse repeat frequency of, for instance, 1 kHz. This signal is sent to amplifier 20, which amplifies the signal and transmits the amplified signal to transducer-receiver unit 22, and this unit then transmits the signal into sample 24.

In this sample 24, the input signal is both distorted and reflected. The distortion creates a distorted signal having a multitude of component signals, each of which has a respective frequency or frequency bandwidth. The distorted signal is reflected by sample 24, and this reflected signal is received by transducer-receiver unit 22, amplified by pre-amplifier 30, and then further amplified by amplifier 32. The received and amplified signal is then sent through a high-pass filter 34 to enhance the relative strength of the desired higher harmonic component of the received signal. The resulting signal is digitized in analog-to-digital converter 36, and then processed by processor 40 to produce an image.

This image may be displayed on a video monitor 42, stored on a video cassette recorder (VCR) 44, output on a printer device 46, or stored in any of a variety of hard copy storage devices 50, such as medical film recorders, digital tape machines, optical disks, magnetic tapes and disks or the like. Suitable means may be used to move the focal point of the transmitted signal around sample 24. For instance, transducer-receiver unit 22 may be a phased array unit having electrical circuitry to move the focal point of the transmitted signal. Alternatively, a motor 52 may be employed to move transducer-receiver unit 22 and thereby move the focal point of the transmitted signal around sample 24.

System 10 can also be operated in a two pulse scheme or mode. In this mode of operation, system 10 generates and transmits into sample 24 two different pulses. Preferably, the transmitted signals are identical except that one of them is scaled up in pressure. The pulses are transmitted one after another with, for example, approximately 1/4000 second interval between them. The reflected, distorted signals from both pulses are received by transducer unit 22, and these signals are then digitized in analog-to-digital converter 36. The digital data values obtained from the first pulse are stored, scaled and then subtracted from the digital data values obtained from the second pulse, producing a difference or resultant signal. Subsequent processing of this difference signal in system 10 is the same as in the above-described one pulse case. One suitable procedure for scaling the digital data values obtained from the first pulse is discussed below.

Several computational models exist which can accurately describe the finite amplitude propagation of a continuous beam. Such models can be extended to compute the case of a propagating pulse as well. These models account for the effects of diffraction, nonlinearity and absorption. One of these models, referred to as the NLP model is described in "New approaches to nonlinear diffractive field propagation" J. Acoust. Soc. Am. 90, 488–499 (1991) by P. T. Christopher and K. J. Parker, the disclosure of which is herein incorporated by reference, and this model was used to compute the following linear and nonlinear examples. This model has been updated to account for the effects of dispersion. The associated harmonic velocities were computed using an algorithm disclosed in "Modeling acoustic field propagation for medical devices," Ph.D. thesis, U. of Rochester (1993) by T. Christopher, the disclosure of which is herein incorporated by reference.

The propagations discussed below are for a Gaussian apodized, axially symmetric focused source. This form of device offers excellent image quality and produces a field comparable to that of the two dimensional array-based transducers now being developed.

Many biomedical imaging devices are not axially symmetric, though. The finite amplitude beams produced by such devices are well described by the computations for the axially symmetric transducers discussed here in detail, though. In measuring the nonlinear harmonic generation from an unfocused rectangular source, Kamakura, Tani, Kumamoto and Ueda noted in "Harmonic generation in finite amplitude sound beams from a rectangular aperture source," J. Acoust. Soc. Am. 97, 3510–3517 (1995), that "the [nonlinear] harmonic pressure levels in the far field [were] almost the same as from a circular aperture source with equal face area and equal initial pressure, independent of the source levels." Though this result was obtained for only one device (with a ratio of source side lengths or aspect ratio of 11 to 6), the higher harmonic pressure levels associated with a non-axially symmetric device are approximately equal to those of the corresponding axially symmetric source. More importantly, the lack of axial symmetry does not affect the relative sidelobe advantages exhibited by the nonlinearly-generated harmonics in a homogeneous propagation. These homogeneous path sidelobe level advantages are the basis for the imaging-relevant advantages of the higher harmonics in an inhomogeneous propagation.

Figure 2A:
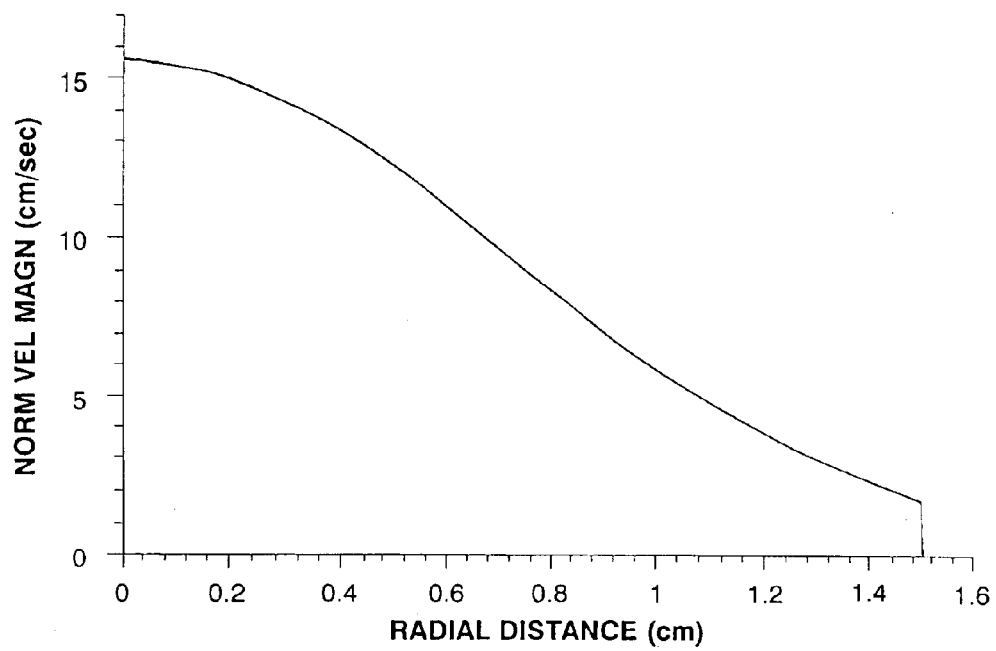
FIGS. 2a, 2b and 2c show various parameters associated with the linear propagation results for a focused 2 MHz Gaussian Transducer operating in a liver medium.
Figure 2B:
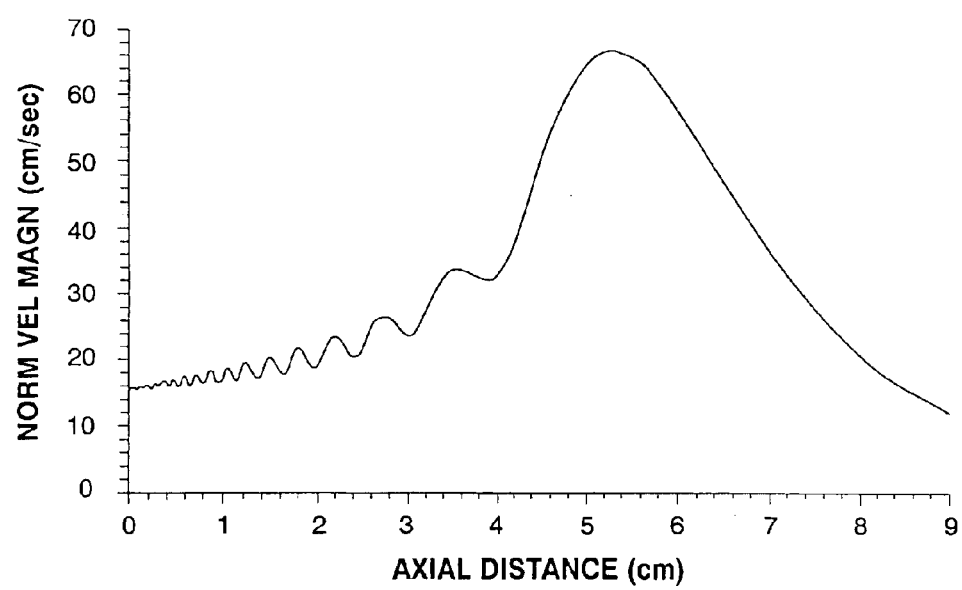
Figure 2C:
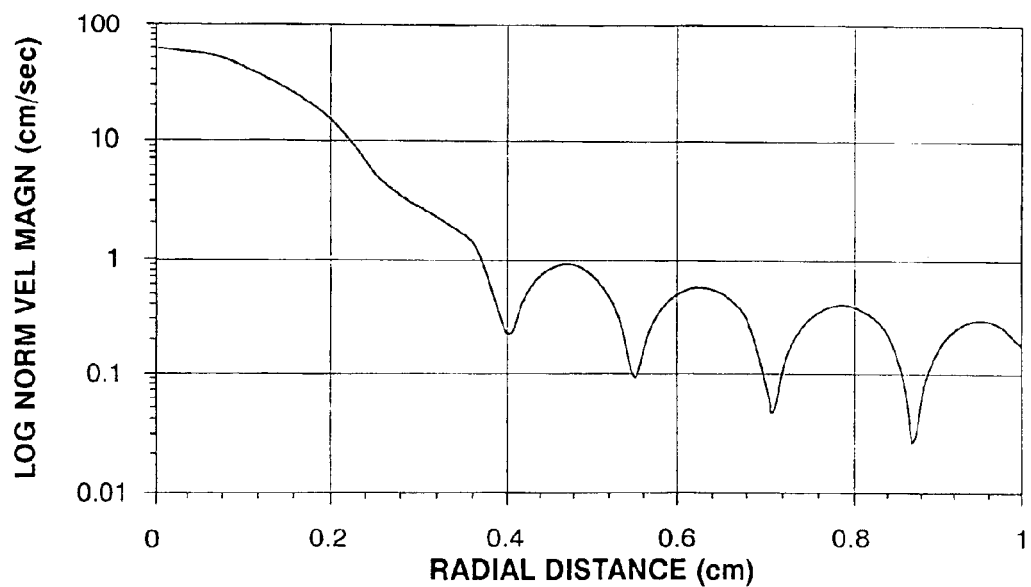

FIGS. 2a, 2b and 2c show various parameters associated with the linear propagation results for a focused 2 MHz Gaussian transducer operating in a liver medium. In particular, the source plane amplitude profile, the on-axis amplitude, are the radial focal plane (at Z=6 cm) beam profile are shown in FIGS. 2a, 2b and 2c were obtained by computing the linear, liver path propagation of the field of a focused 2 MHz Gaussian source using the NLP beam propagation model. The NLP model propagates a planar, normal velocity description of the acoustic field. No inhomogeneities or phase aberrations were accounted for in this propagation or any of the subsequent propagations considered immediately below. The relevant liver propagation parameters used were c=1570 m/s, $\rho=1.05$ g/cm$^3$, $\alpha=0.03$ Np/cm and b=1.3 (where $\alpha$ and b are the coefficients describing absorption in a power law form).

The Gaussian shading of the magnitude of the source plane normal velocity field was such that the half-amplitude radial distance was 0.84 cm. The on-axis, source plane RMS acoustic intensity ($\rho c |u|^2/2$, where u is the acoustic particle velocity) for the field was 2 W/cm$^2$. The radial extent of the source was 1.5 cm. The source plane field was focused using a spherically-focusing factor ($e^{j\theta(r)}$, where $\theta(r)=(2\pi f/c)\sqrt{r^2+F^2}$). The geometric focal length F was 6 cm and the sound speed (c) used to compute $\theta(r)$ was that of water (1500 m/s).

FIGS. 2a and 2b depict the normal velocity magnitudes of the Gaussian transducer's source plane and on-axis fields respectively. FIG. 2c displays the focal plane (z=6 cm) radial profile of the 2 MHz field. The drop in the magnitude of the field from the mainlobe to the first sidelobe in FIG. 2c is 36 dB. In the absence of strong medium phase aberration this allows the device to produce high contrast images.

Figure 3:
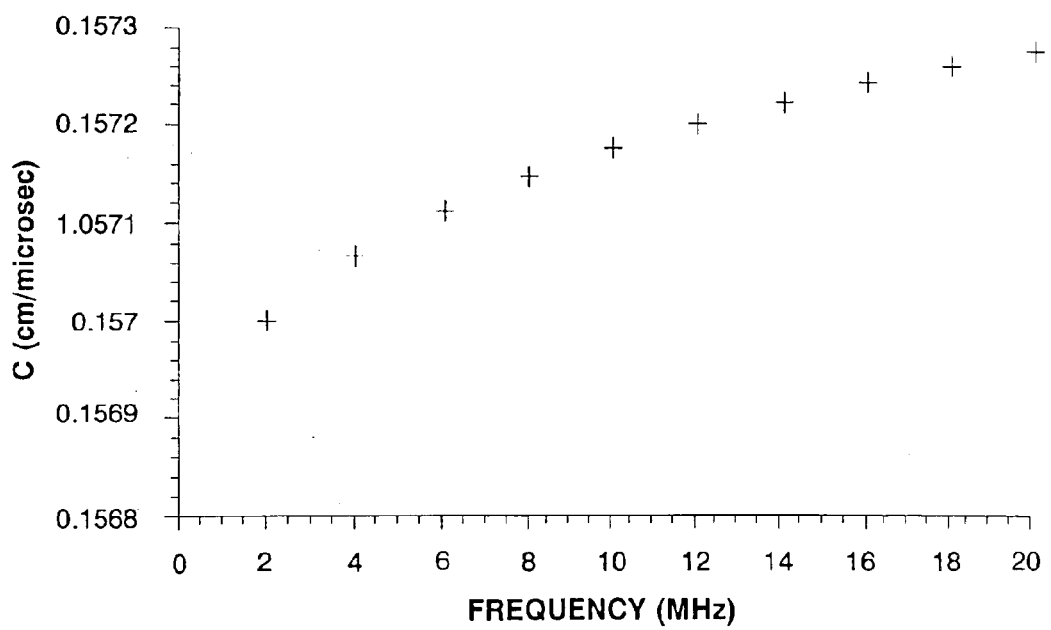
FIG. 3 shows discrete harmonic velocities used to compute various values associated with a 2 MHz propagation in a liver medium.

The same 2 MHz Gaussian source was then propagated nonlinearly through the same liver path. The nonlinear parameter $\beta$ used to represent liver was 4.7. The NLP model used 4 harmonics (2, 4, 6 and 8 MHz) to compute the pre-focal region (z=0 to z=3 cm) propagation and up to 10 harmonics to represent the subsequent focal and post-focal region propagation. The harmonic velocities were computed using the algorithm described in "Modeling acoustic field propagation for medical devices," T. Christopher, Ph.D. Thesis, University of Rochester (1993). The fundamental or 2 MHz component had a propagation speed of 0.157 cm/microsecond (given above as c). The discrete harmonic velocities used by NLP to compute the 2 MHz propagation are shown in FIG. 3.

Figure 4A:
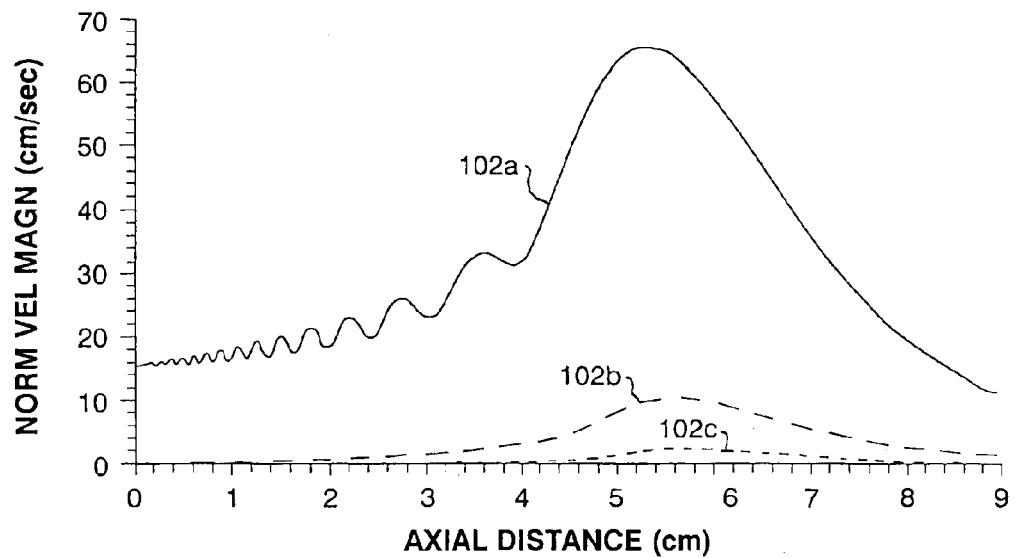
FIGS. 4a and 4b display nonlinear propagation results for a focused 2 MHz Gaussian transducer.
Figure 4B:
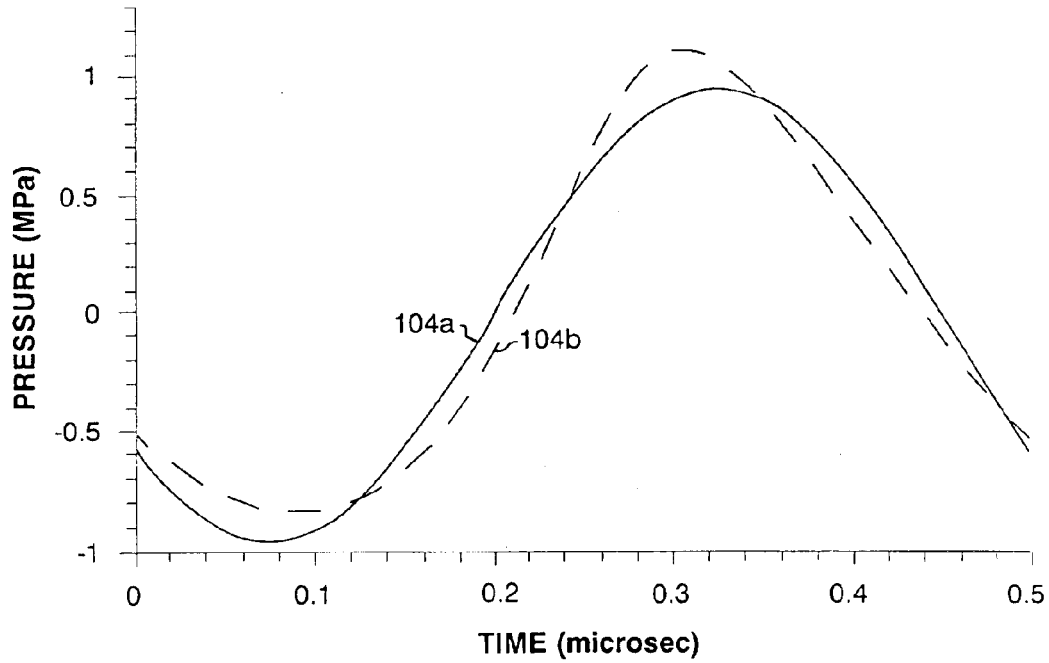

FIG. 4a displays the axial magnitudes of the fundamental, second harmonic, and third harmonic fields, at 102a, 102b and 102c respectively, as computed for the nonlinear propagation. The fundamental or 2 MHz axial curve is only slightly different from the corresponding linear curve shown in FIG. 3b. At z=6 cm the nonlinear 2 MHz curve is about 1% lower than the 2 MHz linear curve. This difference was due to growth of the higher harmonics in the nonlinear propagation. In FIG. 4b the corresponding focal (z=6 cm) pressure waveforms from the linear and nonlinear computations are displayed at 104a and 104b respectively. The pressure waveforms were obtained by converting NLP's normal velocity output to pressure using the impedance relation (all subsequent pressure waveforms were obtained in this way).

The 2 MHz or fundamental beam pattern 104b associated with the nonlinear propagation is almost identical with the 2 MHz beam pattern 104a of the linear propagation. Only in a linearly scaled overlay plot of the two beam patterns are there visible difference. These differences are very small and are limited to the near axis portions of the beam patterns. Only at much higher source intensities are the effects of nonlinearity significant to the details of the fundamental's field. These results are consistent with the empirical observation that linear modeling of biomedical ultrasonic device fields accurately describes their (linear-based homogeneous path) imaging performance.

Figure 5A:
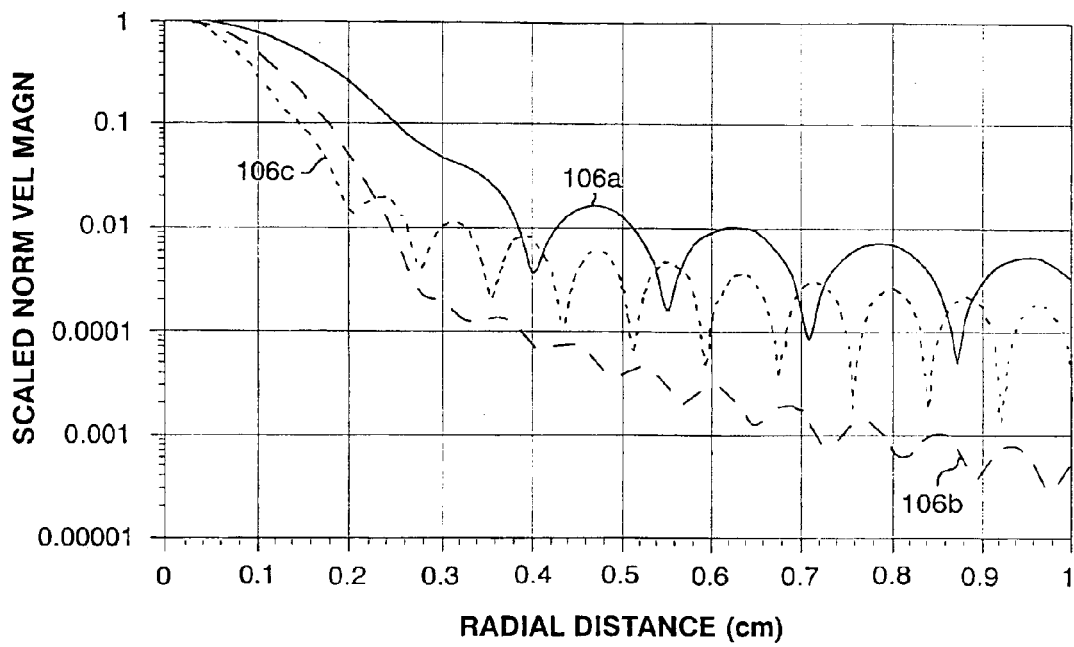
FIG. 5a shows the log-scaled, normalized one-way focal plane profiles of the 2 MHz fundamental, the 4 MHz second harmonic, and the 4 MHz fundamental.

FIG. 5a depicts the 2 MHz fundamental and 4 MHz second harmonic focal plane beam amplitude profiles at 106a and 106b. Also shown in FIG. 5a at 106c is the corresponding 4 MHz fundamental profile. The 4 MHz fundamental result was obtained by computing the linear propagation of the same Gaussian transducer operating at a source frequency of 4 MHz. All three beam profiles in FIG. 5a have been normalized to have on-axis field magnitudes of 1. The finite amplitude distortion-generated second harmonic focal profile 106b has a slightly broader mainlobe than the corresponding (4 MHz) fundamental profile 106c. The radial half-amplitude distance of the second harmonic profile is 36% greater than that of the 4 MHz fundamental profile (0.0983 cm versus 0.9723 cm). The second harmonic profile also has much lower sidelobes than the 4 MHz fundamental profile.

Figure 5B:
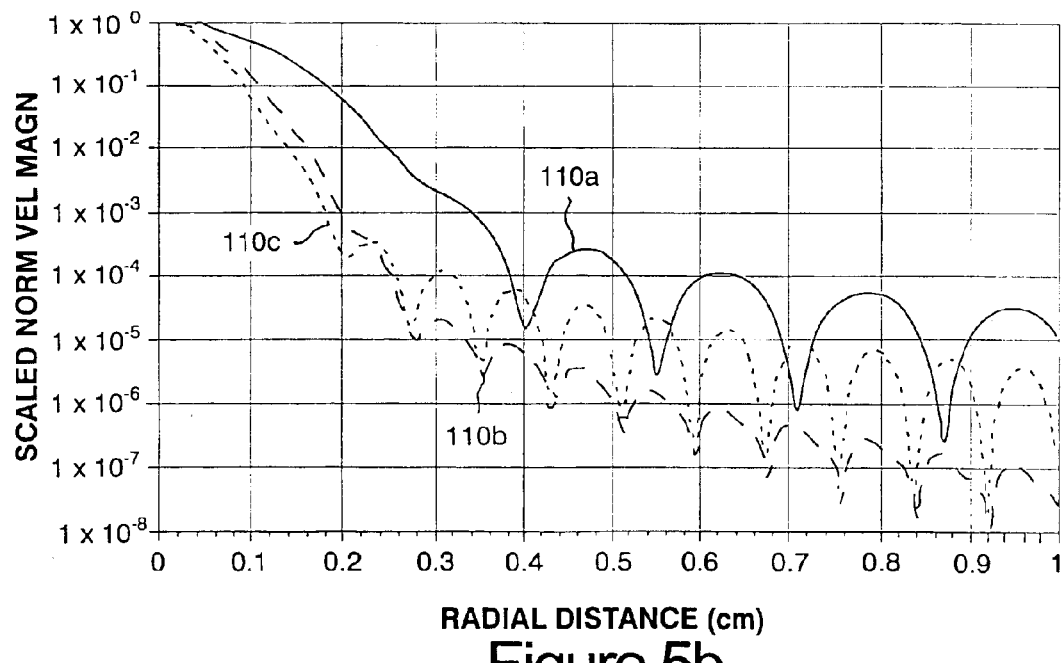
FIG. 5b shows the corresponding two way profiles for these beam patterns.

For imaging purposes, the two-way focal plane beam pattern of the Gaussian transducer is of interest. The two-way focal beam pattern accounts for both the characteristics of the transmitted pulse in the focal plane and the corresponding sensitivity of the transducer to pulses reflected back from this plane. For linear propagations, the two-way beam pattern for a given depth can be obtained by squaring the corresponding transmit or one-way beam pattern. In FIG. 5b the normalized two-way linear beam patterns for the Gaussian transducer operating at 2 and 4 MHz are depicted at 110a and 110b. These curves were obtained by squaring the corresponding one-way or transmit beam patterns shown in FIG. 5a.

Also shown in FIG. 5b at 110c, is the two-way focal plane beam pattern associated with the 4 MHz second harmonic field. Since the amplitudes of the reflected pulses are much smaller than the transmitted pulses, the propagation of the reflected field back to the transducer is essentially linear. Thus, the two-way focal plane beam pattern shown at 110b for the second harmonic was obtained by multiplying the corresponding one-way pattern 106b shown in FIG. 5a by the 4 MHz fundamental one-way pattern 106b also shown in FIG. 5a.

The second harmonic's two-way beam pattern has a half-amplitude mainlobe width (or −6 dB beamwidth) that is 12% greater than that of the corresponding beam pattern 106c. The −20 dB beamwidth of the second harmonic is 13% greater than that of the 4 MHz fundamental. The sidelobe advantage displayed in the focal plane profiles of FIG. 5a is maintained in the two-way results shown in FIG. 5b.

These homogeneous results show that the second harmonic field of a focused, apodized transducer offers advantages in contrast resolution over the corresponding linear transducer field.

A pulse propagation was next considered for the 2 MHz Gaussian source. The on-axis, source plane pressure pulse used is displayed in FIG. 6a as the desired curve 112a. This pulse was computed by applying a Gaussian window to a 2 MHz cosine. The peak pressure of the pulse was the same as for the 2 W/cm$^2$ continuous case considered above. The radial amplitude shading or apodization and the spherical focusing of the source field were also the same as in the previous continuous wave case. The initial source plane pulse consisted of 128 samples across 8 microseconds.

Figure 6A:
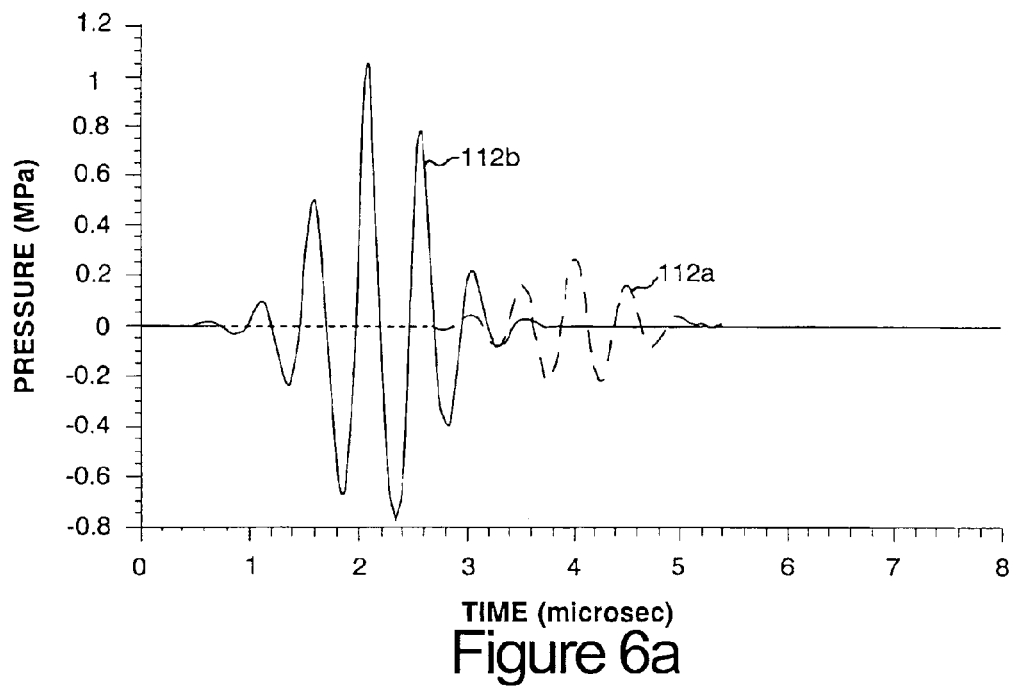
FIG. 6a shows the on-axis source plane and the subsequent focal plane for a 2 MHz Gaussian source.
Figure 6B:
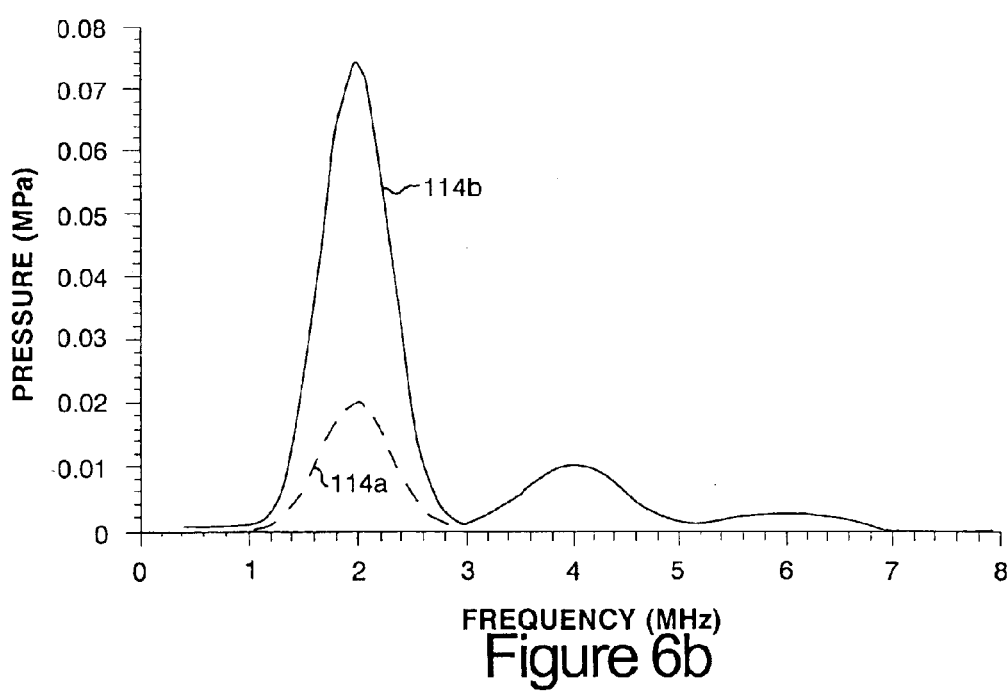

The magnitude of the Fourier transform of the 8 microsecond long source pulse is shown at 114a in FIG. 6b. A straightforward implementation of the nonlinear imaging system and method requires negligible overlap between the sources's spectral bandwidth and that of the nonlinear second harmonic (more generally, this would also insure negligible overlap between any of the successive harmonic spectral bands). The source spectrum 114b shown in FIG. 6b meets this requirement. Nonlinear images based on source pulses with broader spectrums or with significantly more energy in the second harmonic bandwidth than the one depicted at 112b and 114b in FIGS. 6a and 6b could be obtained by using an alternative nonlinear imaging scheme described below.

The source plane was then defined using the 64 harmonic Fourier transform of the source pulses. This multiharmonic source radius was then input into a pulse-propagating version of the NLP model (a model similar to the lithotripter model presented in "Modeling the Dornier HM3 Lithotripter." T. Christopher, *J. Acoust. Soc. Am.* 3088–3095 (1994). The focal output of the resulting nonlinear pulse propagation is also shown in FIGS. 6a and 6b as solid curves. The focal pulse waveform has slightly smaller peak positive and negative pressures than the corresponding continuous waveform shown in FIG. 4b. Consistent with the smaller amplitudes, the focal pulse is also less distorted than the continuous waveform. The ratio of the second harmonic's focal amplitude to that of the fundamental's for this pulse propagation was 70% of the same ratio for the corresponding continuous source considered above.

Figure 6C:
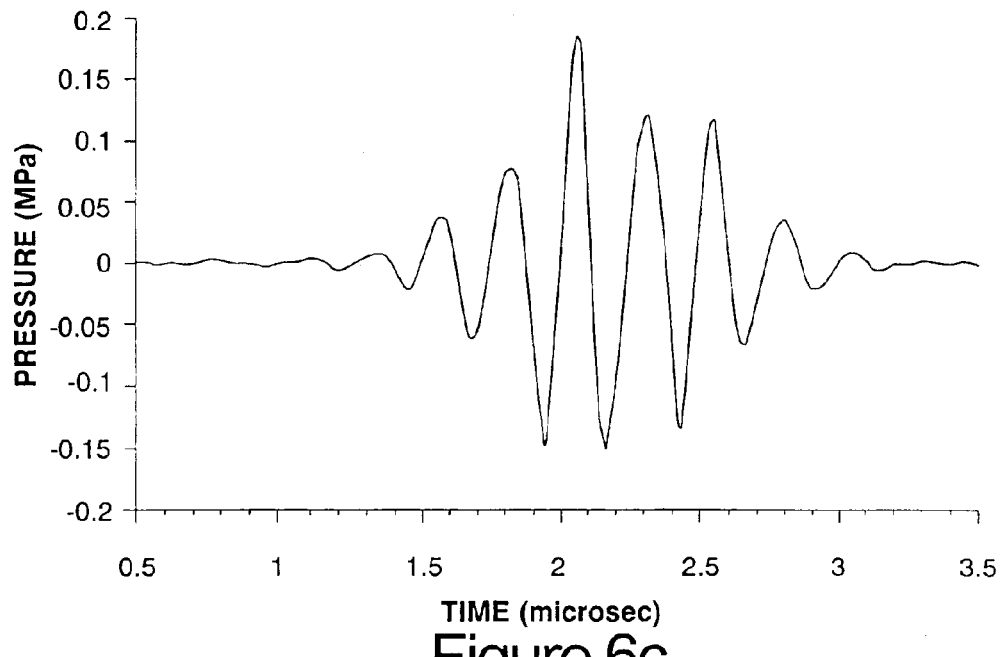
FIG. 6c shows the focal nonlinear distortion pulse obtained by constructing the waveform using only the focal spectral information shown in FIG. 6b from 3 to 8 MHz.

In FIG. 6c, the waveform associated with only the spectral bands of the second, third, and the first half of the fourth harmonic (3 through 8 MHz) is shown. This waveform was computed as a high pass filtered reconstruction of the spectral information depicted in FIG. 6b. A rectangular window with a transition at 3 MHz was used in filtering the transform data. The straightforward nonlinear imaging approach disclosed herein may use a distortion pulse like that shown in FIG. 6c in order to image the scattering medium.

Figure 7:
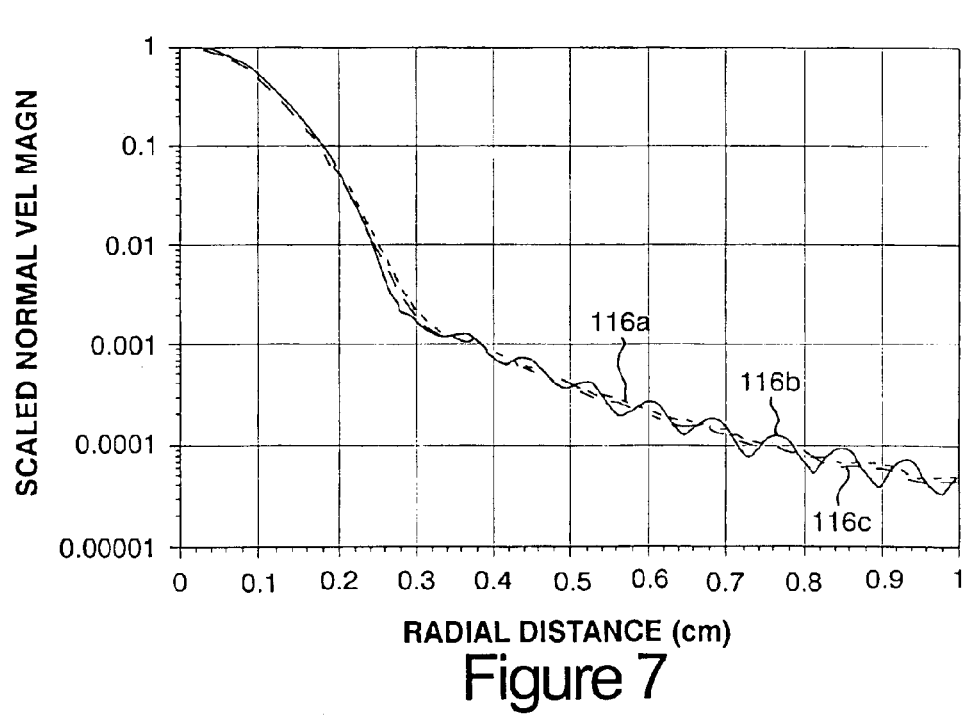
FIG. 7 shows the focal plane profile from a 2 MHz continuous wave propagation and a 2 MHz centered pulse propagation.

Not shown for the pulse propagation considered are the axial and radial harmonic descriptions. These descriptions were found to be identical in form to those computed for the nonlinear propagation of the continuous 2 MHz field. All other Gaussian-windowed cosine pulses were found to produce identical axial and radial harmonic patterns. The temporal peak amplitude profile of the high pass filtered-focal plane data also very closely followed the form of the 4 MHz second harmonic's amplitude profile. The temporal peak amplitude profile for the pulse propagation considered herein is shown at 116a in FIG. 7. This profile was computed using the focal plane frequency data in the range of 3 to 8 MHz (like the waveform in FIG. 6c). Also shown at 116b and 116c in FIG. 7 are the corresponding 4 MHz second harmonic profile and a second harmonic bandpass filtered (3 to 5 MHz)-temporal peak amplitude profile for the same pulse propagation. The similarity of the two peak amplitude profiles suggests that there is very little energy above 5 MHz for this pulse propagation. The nonlinear harmonic beam and peak amplitude patterns produced by any reasonable source pulse can be computed using an appropriate continuous approximation of the source.

In order for the nonlinearly-generated higher harmonics to be available for imaging in an inhomogeneous media, the received higher harmonics amplitudes cannot be too low relative to the received linear (or transmitted) signal and the transducer's dynamic range. Also, to be available for imaging use, preferably the associated in vivo field amplitudes have a mechanical index less than 1.9.

For the previously considered nonlinear 2 MHz, liver-path propagation, the amplitudes at the focus (z=6 cm) of the fundamental and second harmonic were 0.943 MPa and 0.166 MPa, respectively. The second harmonic amplitude was thus 15.09 dB below the amplitude of the 2 MHz transmitted wave. As a wave reflected at the focal point travels the 6 cm back to the transducer/receiver, frequency dependent attenuation reduces the second harmonic by an additional 5.62 dB relative to the 2 MHz component. The received 4 MHz component would thus be 20.71 dB below the transmitted 2 MHz component. The corresponding figures for the 6 MHz third harmonic are 27 dB down at the focus and 39.23 dB down for received signals. This calculation, it should be noted, does not include the effect of the possible additional relative weakening of the second harmonic received signal due to coherent reflectors at the focus in combination with the smaller mainlobe of the second harmonic. This effect is not significant to many bio-ultrasound imaging applications, though.

Table 1 of FIG. 8 displays the second and third harmonic received levels at on-axis, source plane intensity values of 0.5, 1, 2, 4 and 8 W/cm$^2$. For a given source plane intensity, pulsed devices would have slightly larger received level differentials than those shown in Table 1. For the pulsed propagation considered above, this additional gap would be 0.86 dB for the second harmonic (based on second harmonic bandpass reconstruction and a comparison of the received peak positive pressure levels).

Current biomedical ultrasonic imaging transducers have dynamic ranges of about 100 dB. Even with decreased sensitivity above the transmit frequencies, these devices are capable of creating second harmonic images. This capability has been demonstrated by the creation of second harmonic contrast agent-response images. Alternatively, a separate receiver device with appropriate frequency response in the desired nonlinear distortion bandwidth can be used.

The effect of focal length on the received second harmonic levels for this Gaussian transducer operating at 2 W/cm$^2$ id shown in Table 2 of FIG. 9. From a focal length of 4 cm up to a focal length of 12 cm the received second harmonic levels dropped off by 7.32 dB. Also shown in Table 2 are the corresponding focal second harmonic levels. These levels remained very constant and thus revealed the decreases in received levels as almost entirely due to increased return trip distances.

The peak positive and negative pressures of the in vivo nonlinear waveform shown in FIG. 4b were 1.12 and –0.84 MPa, respectively. The –0.84 peak rarefaction pressure corresponds to a mechanical index (MI) of 0.59. The highest preferred level for the mechanical index is 1.9. Shown in Table 1 are values of the computed minimum focal pressure and associated mechanical index for this and four other values of source plane intensity. The minimum pressures and thus mechanical indices given in Table 1 have been corrected for the effects of nonlinearity. A linear-only computation would result in larger negative pressures and MI values, in particular at the highest two source intensity levels.

The numbers shown in Table 1 show that for in vivo propagations similar to the one considered here, finite amplitude distortion-based images are readily obtainable within the current mechanical index safety limit. Even at the lowest source intensity case considered (0.5 W/cm$^2$), a largely second harmonic-based image can be obtained by simply filtering out the transmitted frequency or frequencies. Additionally the second and third harmonic received levels offer some real-time feedback on the magnitude of the focal field amplitudes themselves. Finally, the results displayed in Table 2 suggest that second harmonic imaging may be available at a wide range of focal depths.

The formation of the higher harmonic constituent beams in a propagation finite amplitude beam is a continuous process. In the case of the 2 MHz Gaussian-shaded, focused beam considered above, the 4 MHz second harmonic, the 6 MHz third harmonic, and additional higher harmonics are continuously and cumulatively produced by the beam as it propagates away from the source. Of interest here is the production and focusing of these nonlinear higher harmonic beams between the source and focal plane.

The origin of the higher harmonic beams is the ongoing nonlinear distortion of the propagating waves comprising the (total harmonic) focused beam. The physical effects of diffraction and absorption concurrently act on the higher harmonic beams and thus further define their propagation as well as contribute to changes in the resulting focused beam. The NLP model assumes that the nonlinear or finite amplitude distortion acts in a plane wave fashion on the waves comprising the focused beam. The NLP model uses the frequency domain solution to Burgers' equation in an incremental $\Delta z$ fashion to account for this plane wave distortion approximation.

The frequency domain solution to Burgers' equation as used in the NLP model can be written $$\frac{\partial u_n}{\partial z} = j\frac{\beta \pi f}{2c^2}\left\{\sum_{k=1}^{n-1} k u_k u_{n-k} + \sum_{k=n}^{N} n u_k u_{k-n}^*\right\}, n = 1, 2, \cdots, N$$

where $f$ is the fundamental frequency and $u_n$ is the nth term in an N term complex Fourier series describing the temporal normal velocity waveform at a radial point in the radial description of the field. The first summation term in the parentheses represents the accretion of the nth harmonic by nonlinear combination of other harmonics that have a sum frequency of $nf$. The second summation term (with conjugation) represents the depletion of the nth harmonic to other harmonics with a difference frequency of $nf$. For the case of a Fourier representation of a (periodic) pulse waveform, this accretion and depletion of harmonics results in some interesting phenomenon including the production of a distortion bandwidth below the fundamental bandwidth.

Of interest are the terms in equation (1) contributing to the growth of the second harmonic and, to a lesser extent, the third harmonic. When n equals 2 in equation (1), the positive contributions to $$\frac{\partial u_2}{\partial z}$$

come from the $1u_1u_1$ term comprising the first summation. The negative contributions to the second harmonic are represented by the second summation in equation (1) and for the propagations under consideration here can be approximated by the second term in that summation, $2u_3u_1^*$. Even this term, though, is negligible throughout most of the source to focal region propagation due to the relatively small amplitudes of the third harmonic. Thus, the nonlinear production of the second harmonic throughout most of the relevant propagation region is simply proportional to the square of the amplitude of the fundamental.

When n equals 3 in equation (1), the positive contributions to $$\frac{\partial u_3}{\partial z}$$

come from the first two terms comprising the first summation. These two terms sum to $3u_1u_2$. The first term of the corresponding negative contributions to the third harmonic is $3u_4u_1^*$. This term and it's successors are negligible for all but the focal region of the highest intensity propagations considered herein.

The harmonic sources of the second harmonic and third harmonic are thus $1u_1u_1$ and $3u_1u_2$, respectively. At a given point in the field of the propagating beam then, the finite amplitude production of the second harmonic is proportional to the square of the fundamental harmonic's amplitude. The production of the second harmonic off the beam axis is very small since the amplitude of the fundamental beam there is quite small. The third harmonic is produced in portion to the product of the first and second harmonics and thus its nonlinear production is even more strongly weighted towards the beam axis.

Also of interest is how the production of the second and third harmonics vary with the z coordinate. Neglecting the effects of absorption and approximating the effects of focusing by assuming spherically-converging wave propagation, the amplitudes of the fundamental harmonic's mainbeam increases approximately linearly with distance from the source to the focus. At z=F/2 the on-axis amplitudes of the beam are about twice the corresponding source plane amplitudes. Following from the same approximations, the fundamental's mainbeam width at z=F/2 is about half its source plane width. Thus, at z=F/2 the area of the fundamental's mainbeam is about ¼ the corresponding source plane area. Together, this relation and the previous amplitude relation suggest that the second harmonic beam production rate versus z is constant (z<F), with rate losses due to diminishing fundamental mainbeam area balanced by the concurrent gains due to increased fundamental amplitudes.

Figure 10A:
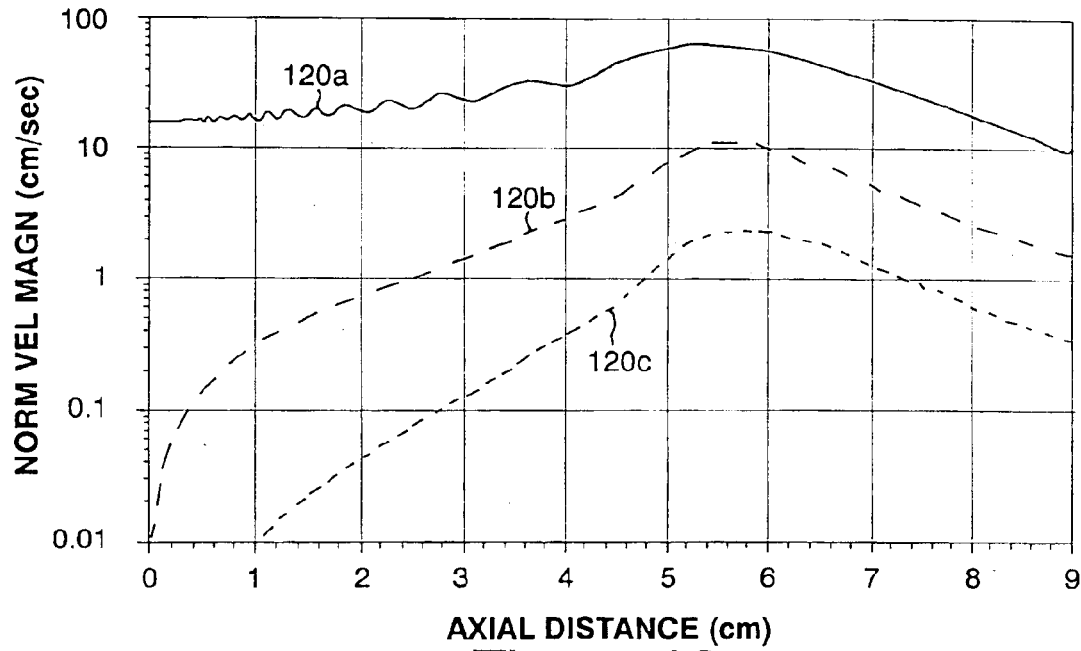
FIGS. 10a and 10b show the log-scaled first, second and third harmonic axial amplitudes for the focused 2 MHz Gaussian transducer and the corresponding long-scaled focal plane radial beam profiles.

The fact that the third harmonic production is proportional to the product of the fundamental and second harmonic amplitude, though, implies that the production of the third harmonic is strongly weighted towards the focal region. In FIG. 10a the log-scaled, axial amplitudes of the fundamental, second, and third harmonics are displayed at 120a, 120b and 120c respectively. The source was the same focused 2 MHz Gaussian source considered above. The medium's parameters were again those of liver. Consistent with the above discussion, the amplitudes of the second harmonic exhibit a relatively large gain in its growth from low near field values to significant focal amplitudes. The third harmonic exhibits an even higher gain, approximately duplicating the growth in gain from the fundamental to the second harmonic. Both harmonics, though, display postfocal region amplitude declines which parallel those of the fundamental.

Figure 10B:
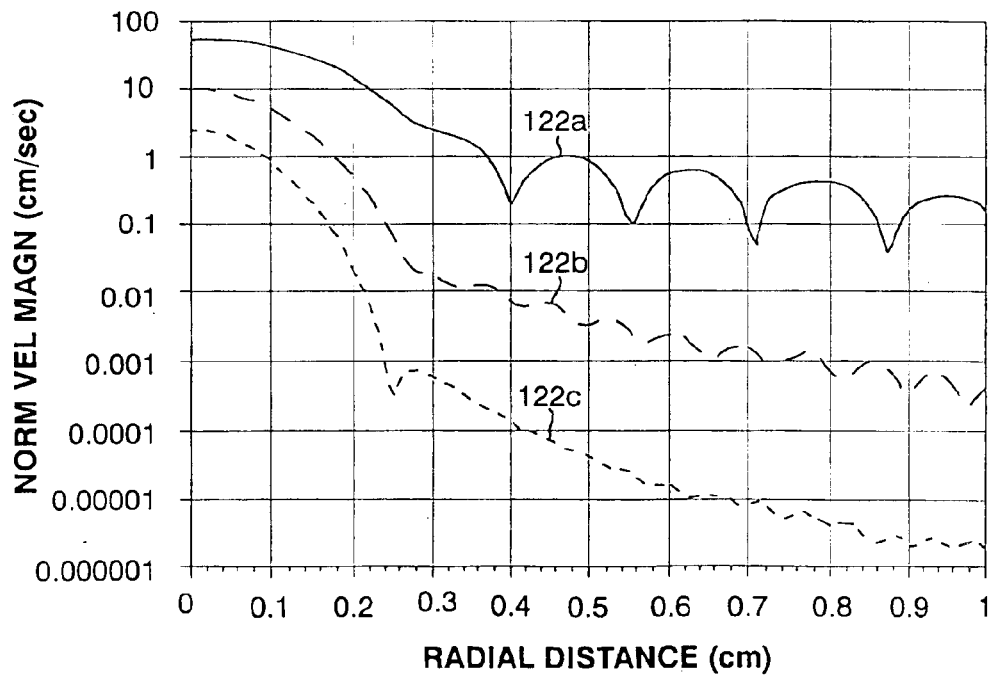

In FIG. 10b the corresponding log-scaled, focal plane (z=6 cm, one way) radial beam profiles are displayed at 122a, 122b and 122c respectively. The fundamental profile drops 49.8 dB over the 1 cm radial range displayed. The second harmonic approximately squares this decline in dropping 85.3 dB. The third harmonic then continues the relationship in dropping 120.5 dB. These declines reflect the second and third harmonic, finite amplitude production rates discussed above. At z=8 cm this relationship between the harmonic beam profiles continued to hold.

Figure 11:
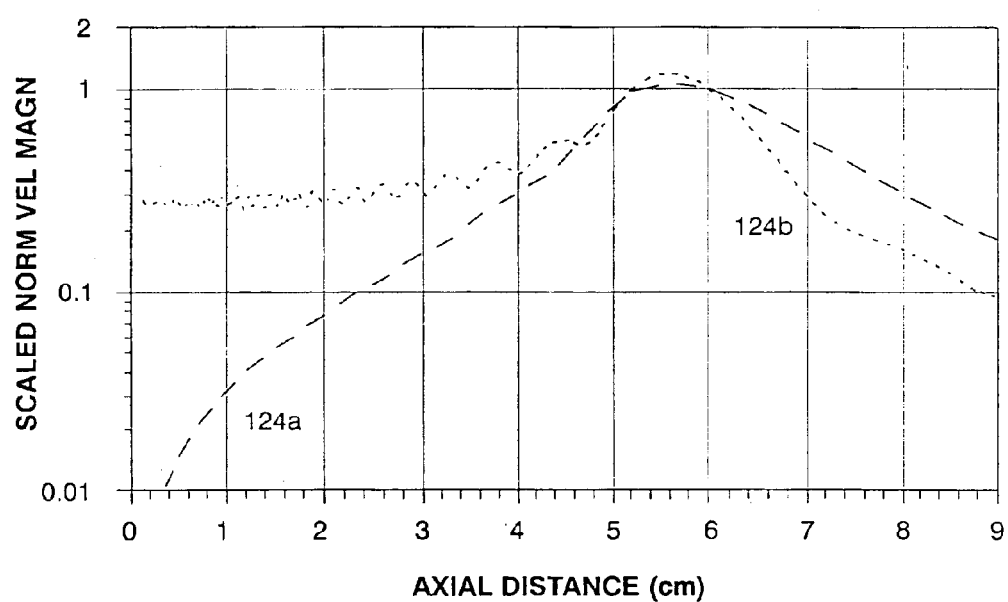
FIG. 11 illustrates scaled axial amplitudes for a 4 MHz second harmonic and 4 MHz fundamental harmonic beams in a liver medium.

In FIG. 11, the axial amplitudes of the 4 MHz second harmonic beam, shown at 124a, are overlaid with the corresponding 4 MHz fundamental harmonic beam, shown at 124b. The on-axis source of both of the respective propagations was 2 w/cm². The axial curves have been normalized to be unity at z=6 cm and log-scaled. The 4 MHz second harmonic focal amplitude was originally (prenormalization) 15.0 dB before the corresponding fundamental value. The two curves are close through the focal region and then depart shortly after z=6 cm as the 4 MHz linear curve rapidly declines.

The results displayed in FIGS. 10a, 10b, and 11 show that the 4 MHz second harmonic beam may be less susceptible to the defocusing effects of near field phase aberrations than a 4 MHz fundamental beam. Since only a fraction of the second harmonic beam forms in the near field, only this fraction could be redirected or defocused by near field jitter. The corresponding 2 MHz fundamental beam, though, would pass in its entirety through the aberration and suffer the consequent defocusing effects including increased focal plane sidelobe levels. Secondarily, though, these higher 2 MHz sidelobe levels could, in turn, increase the off-axis nonlinear production of the 4 MHz second harmonic.

In order to investigate the effects of tissue-based phase aberration on the characteristics of linear and nonlinear beams, planes of phase delay or jitter were introduced into linear and nonlinear propagations of the focused Gaussian transducer. These phase delay planes were computed using measured time delays from 5 abdominal wall layers and 5 breast wall layers. The 5 abdominal wall specimens had layer thicknesses of 2.5, 2.0, 1.5, 1.5, and 1.0–3.0 cm (a non-uniform layer) giving an average thickness of 1.9 cm. The 5 breast wall specimens had layer thicknesses of 1.5–2.5, 3.0–3.5, 3.5, 4.0 and 2.0–2.5 cm, giving an average thickness of 3.0 cm. The average thicknesses of the non-uniform layers were used to compute the 5-layer averages. All of the measured abdominal wall and breast wall layers contained an outer skin layer.

Each of the measured abdominal wall time delay planes was converted to an equivalent 2 MHz phase delay plane. Each of these delay planes was then scaled by 0.5 (i.e., each phase delay was reduced by a factor of 2) and then applied twice to a given beam propagation to represent the cumulative aspect of the actual tissue delays. In applying a single delay plane, the 2 MHz phase delay values were scaled for appropriate application to each harmonic present in the computed field. The first delay plane was encountered by the propagating field at z=0.5 cm and the second plane at z=1.5 cm. Further, subdivision c and subsequent applications of the abdominal wall delay data did not appear to be necessary since it did not significantly change the resulting focal plane fields. Thus, the 2 delay plane application scheme satisfied the thin lens approximation. The breast delay planes were likewise applied in two steps, the first at z=1 cm and the second z=2 cm. For both tissue types, the z placement was selected to represent the average slice thickness and also to be convenient for the $\Delta z$ step size utilized by the linear propagation.

Figure 12A:
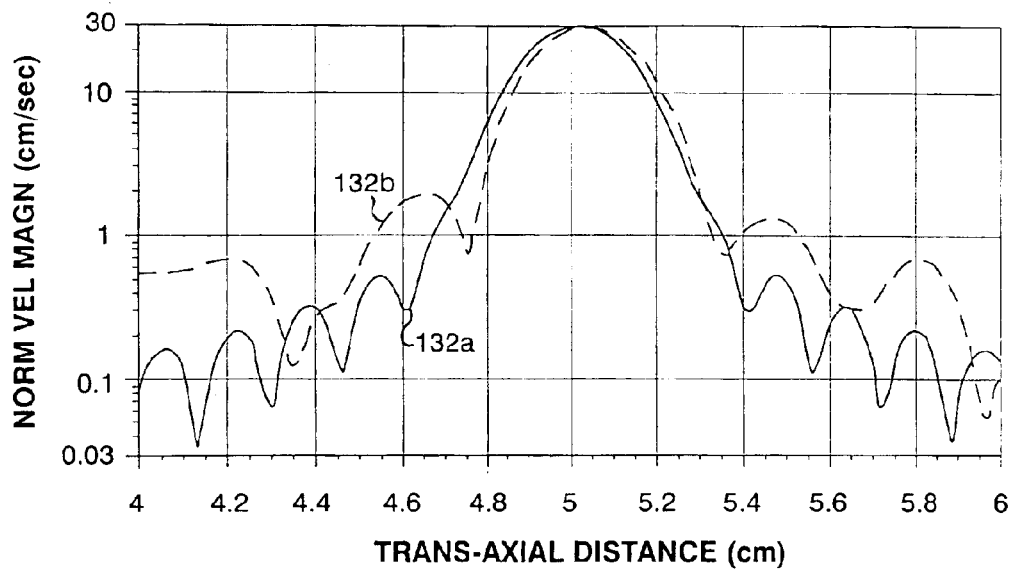
FIGS. 12a–12f depict pairs of one-way focal plane harmonic amplitude diameters and the corresponding average radii for an unjittered, or homogeneous, path and an abdominal wall-jittered propagation path.
Figure 12B:
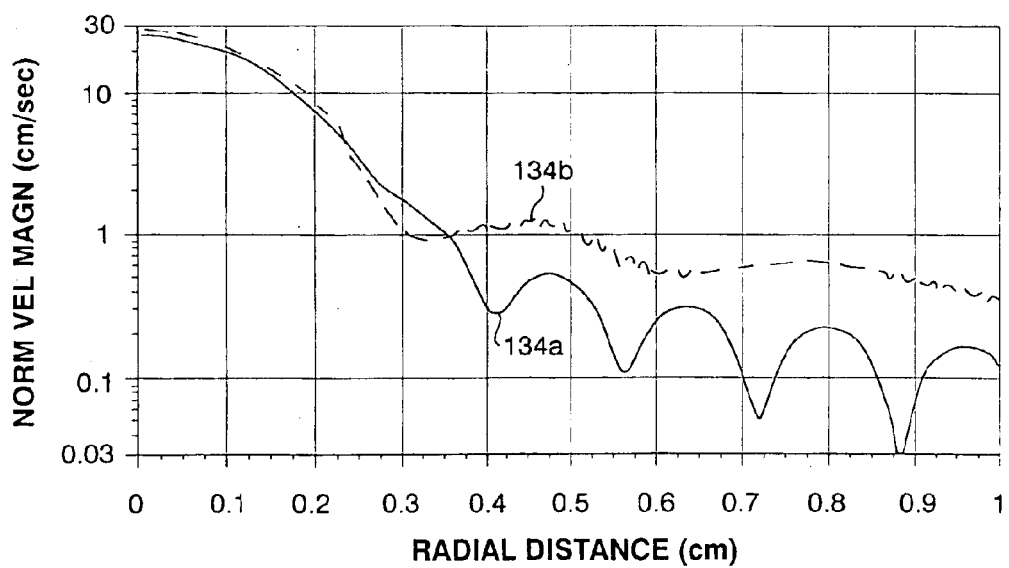
Figure 12C:
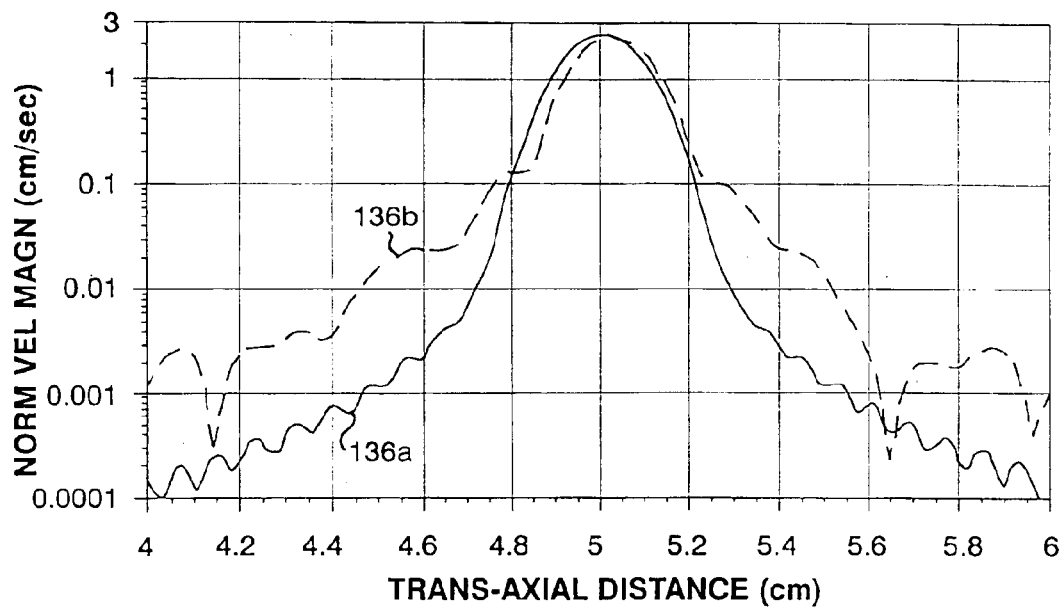
Figure 12D:
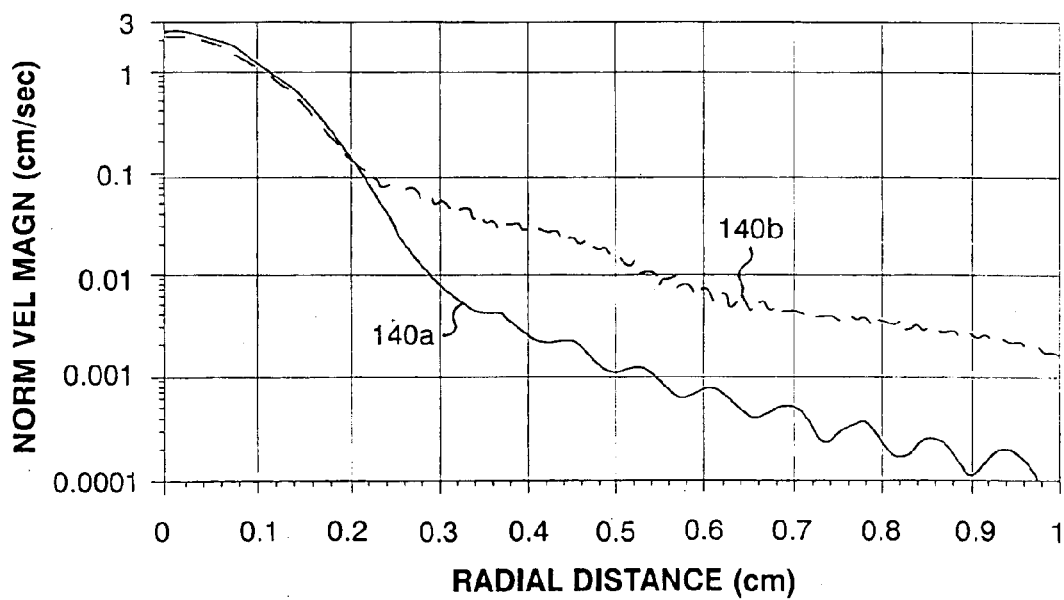
Figure 12E:
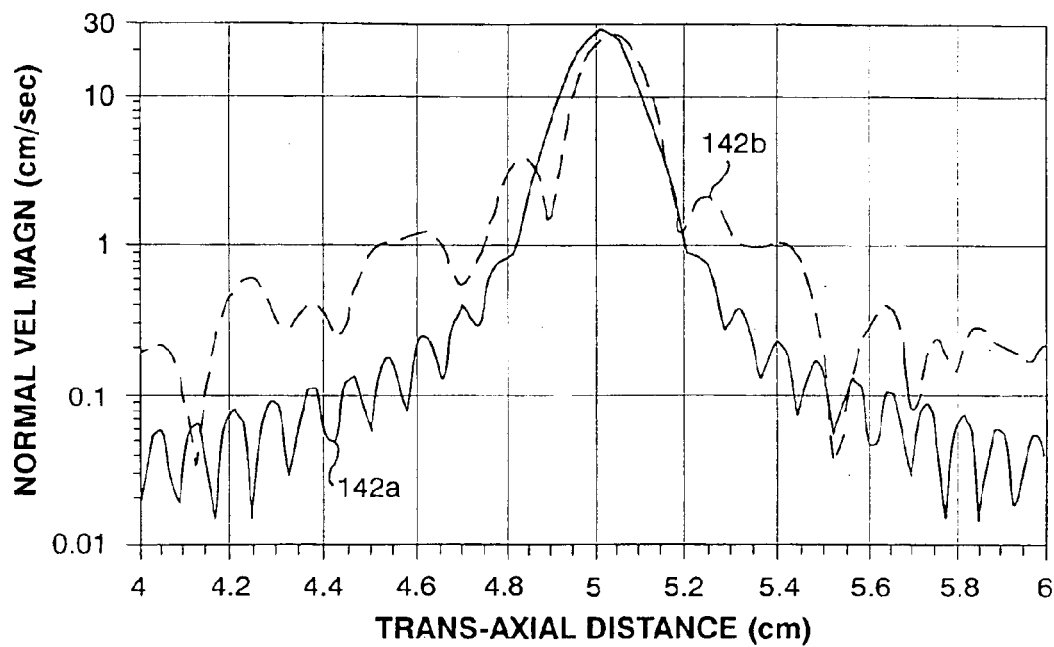
Figure 12F:
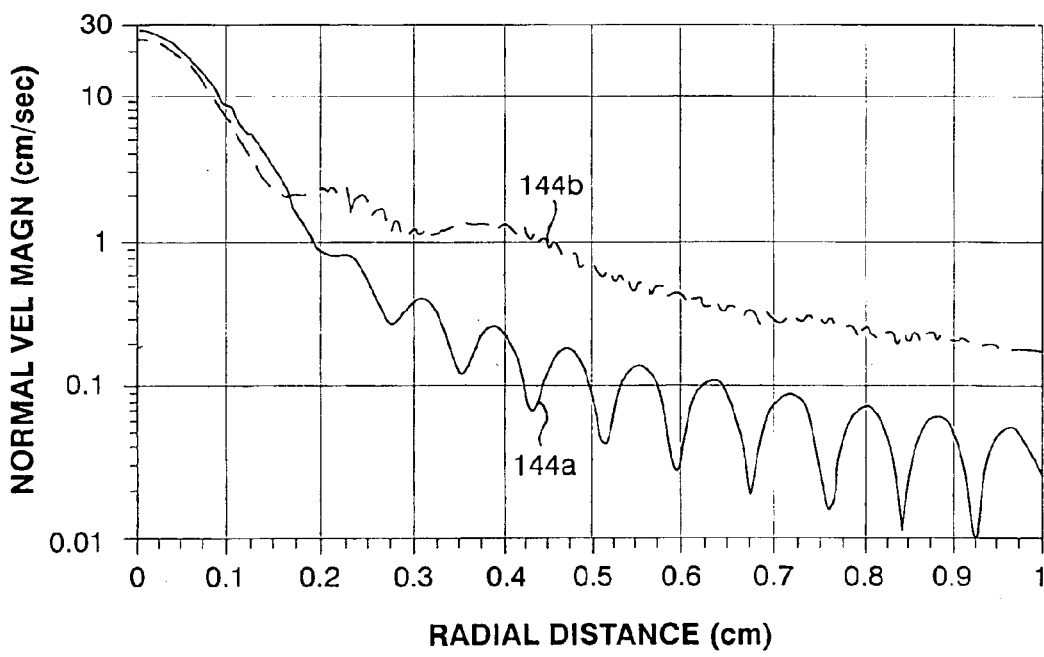

FIGS. 12a–12f depict pairs of one-way focal plane harmonic amplitude diameters and the corresponding average radii for an unjittered (or homogeneous) path and an abdominal wall-jittered propagation path. The propagation parameters of both mediums were again those of liver. In FIG. 12a the corresponding focal plane diameters for the unjittered and jittered 2 MHz fields are overlaid at 132a and 132b respectively. In FIG. 12b the corresponding average radii are shown at 134a and 134b respectively for the 2 MHz fields. The average radii were obtained by averaging the focal plane grid of amplitudes around the axis. The corresponding results for the second harmonic 4 MHz are shown at 136a, 136b, 140a and 140b in FIGS. 12c and 12d, and for the fundamental 4 MHz fields are shown in at 142a, 142b, 144a, and 144b in FIGS. 12e and 12f. In all of these Figures, the unjittered field is displayed using solid curves.

In FIGS. 12a–12f, two basic effects of jitter are visible. The first is the increased sidelobe levels associated with the defocusing of the abdominal wall phase delays. This sidelobe effect is more prominent for both of the 4 MHz fields than for the 2 MHz fundamental field. The shorter wavelengths of these 4 MHz fields allows for greater de-focusing by the phase screen. The second harmonic 4 MHz field also gets a sidelobe level increase from the corresponding increase in the 2 MHz field's sidelobe levels.

The second impact revealed in FIGS. 12a–12f is that there are small changes in the mainlobes of all three harmonic fields. In particular, in the diameter FIGS. 12a, 12c and 12e, a shift in the peak or center of the jittered lobes can be seen. In the corresponding average FIGS. 12b, 12d and 12f though, the impact of the jitter is negligible down to approximately 20 dB below the peak on-axis value. Thus, the impact of this abdominal wall-jittering does not appear to involve any significant broadening of the mainlobes. Finally, both of the jittered 4 MHz mainlobes show decreases in peak amplitudes which are consistent with the increased energy present in the sidelobe regions.

Figure 13A:
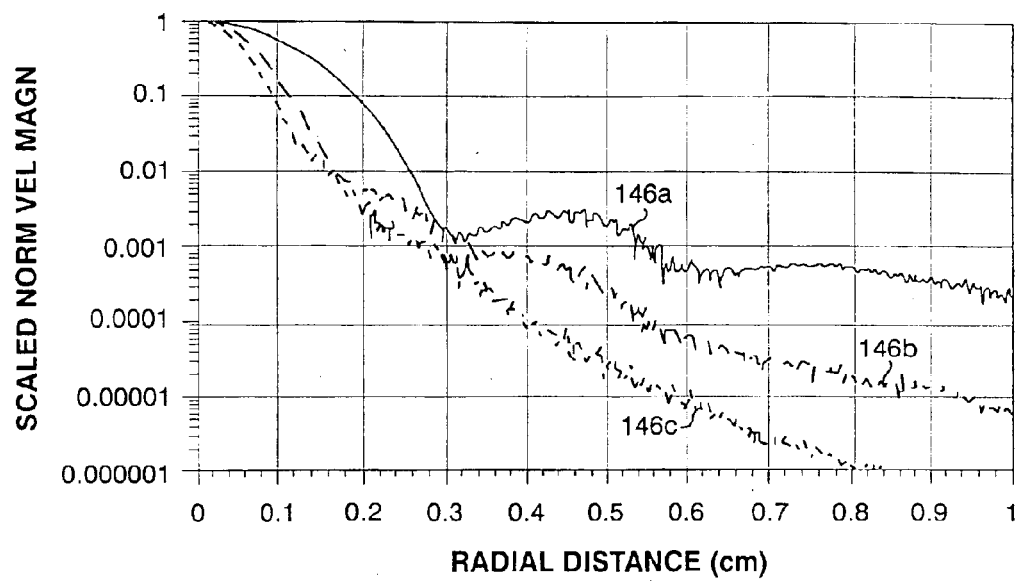
FIGS. 13a–13d show two-way average radii results for the abdominal wall-jittered propagation path represented in FIGS. 12a–12f.
Figure 13B:
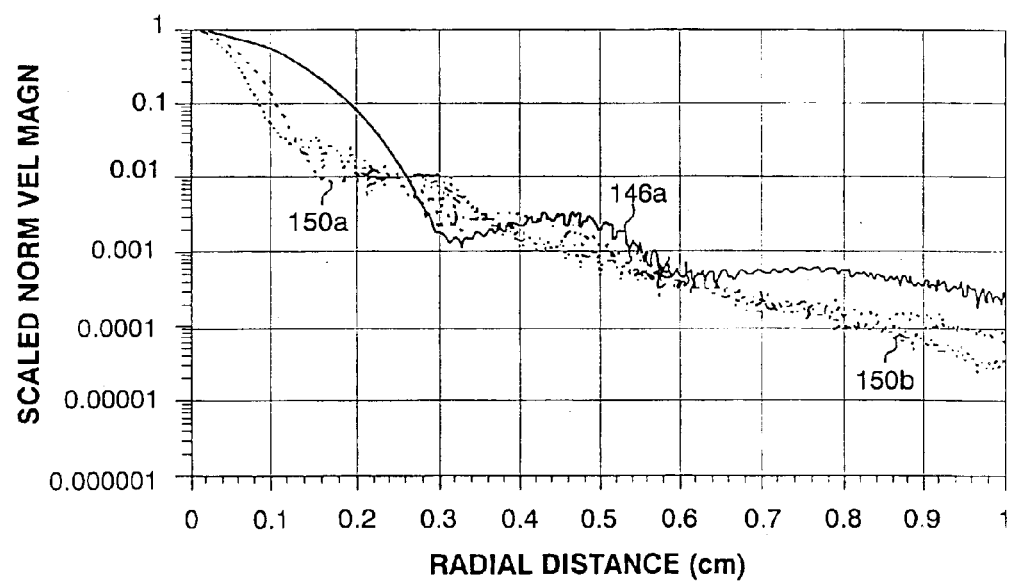
Figure 13C:
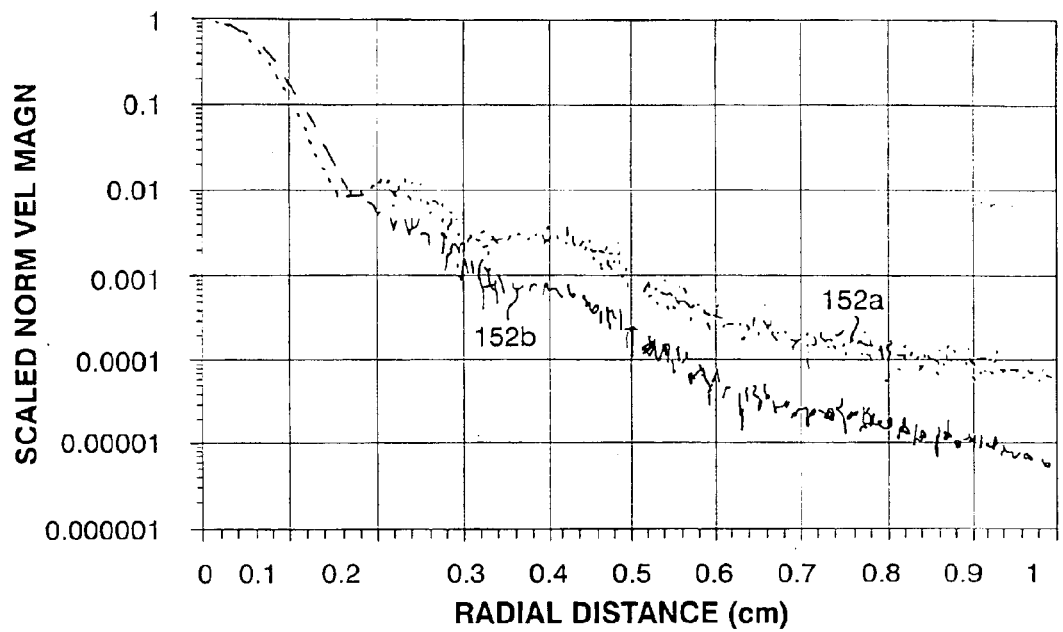
Figure 13D:
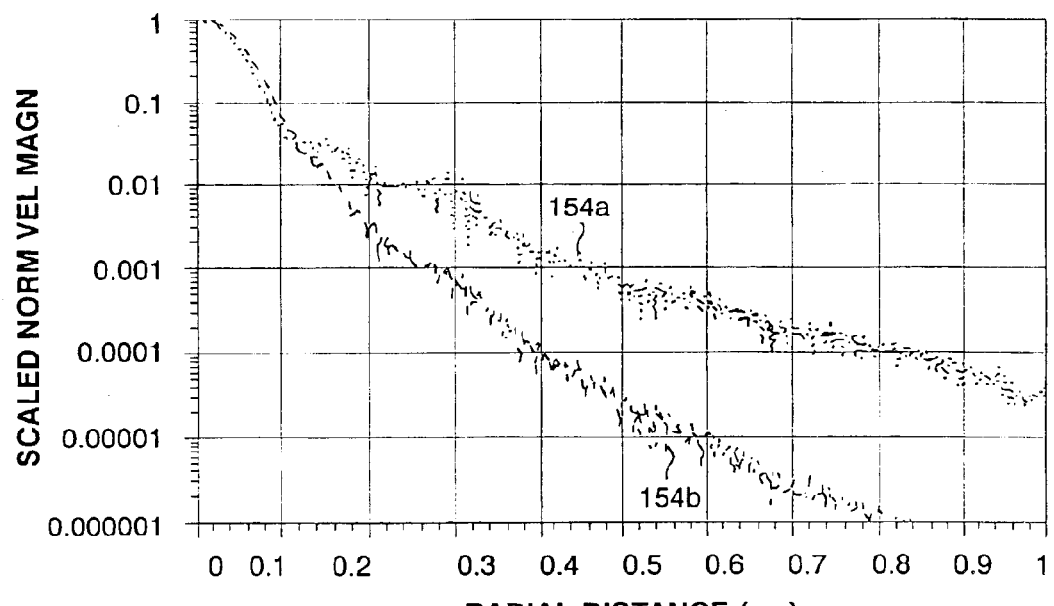

FIGS. 13a–13d show two-way average radii results for the same abdominal wall-jittered propagation. Each of the curves shown was obtained by radially averaging the corresponding two-way planar data and then scaling the on-axis value to unity. The 2 MHz fundamental, 4 MHz second harmonic, and 6 MHz third harmonic average radii are shown at 146a, 146b and 146c in FIG. 13a. The 2, 4 and 6 MHz fundamentals are shown at 146a, 150a and 150b in FIG. 13b. The average two-way sidelobe levels of the second and third harmonic can be seen to be significantly lower than those of any of the fundamental harmonics. In FIG. 13c, the two 4 MHz average two-way profiles are shown at 152a and 152b. The 4 MHz fundamental curve has a slightly narrower mainlobe (9.5% at 20 dB down from peak) and significantly higher sidelobe levels than the 4 MHz second harmonic profile. Likewise, FIG. 13d shows the 6 MHz fundamental and 6 MHz third harmonic two-way profiles at 154a and 154b. The 6 MHz fundamental curve is 10.9% narrower at the −20 dB level and also shows higher sidelobe levels than the third harmonic curve.

Figure 14A:
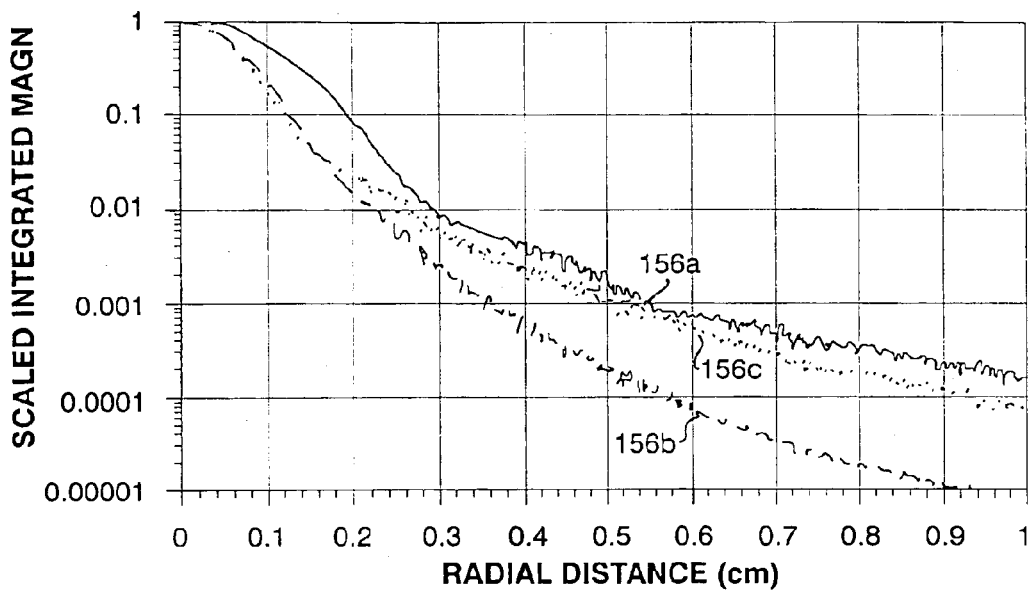
FIGS. 14a and 14b display normalized two-way averaged radial results from five abdominal wall-jittered propagations for the 2 MHz fundamentals, the 4 MHz second harmonics and the 4 MHz fundamentals, and the corresponding radially integrated magnitudes.
Figure 14B:
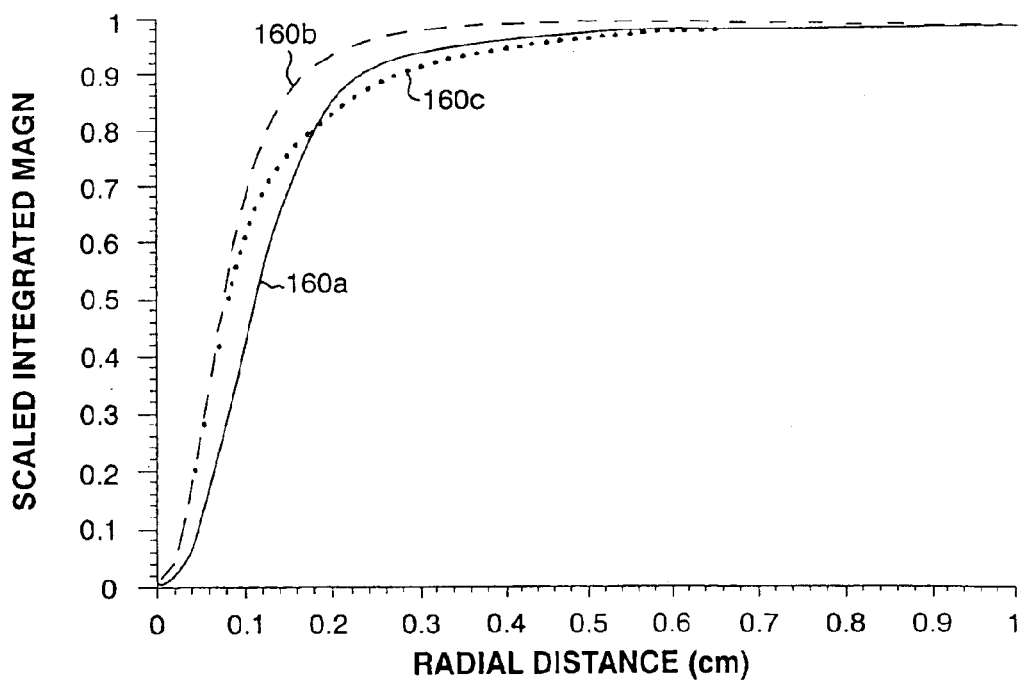

The results shown in FIGS. 13a–13d show that the second and third harmonics maintain lower sidelobe levels than the corresponding fundamental harmonics in propagating through abdominal wall. In FIGS. 14a and 14b, radial results obtained by averaging across 5 abdominal wall-jittered propagations are shown. In FIG. 14a the normalized radial averages from the 5 two-way planar amplitude data sets are depicted. The average 2 MHz result is overlaid with the corresponding 4 MHz second harmonic and 4 MHz fundamental curves 156a, 156b and 156c respectively. The −20 dB width of the 4 MHz fundamental profile 156c is 6.6% narrower than the 4 MHz second harmonic profile 156b. The −20 dB width for this and multiple propagation-averaged results are given in Table 3 of FIG. 15.

Each of the two-way average profiles shown in FIG. 14a was then radially summed. Each of the average profiles consisted of 499 radial position-magnitude value pairs, $(r_i, m_i)$, i=1, ..., 499. The 499 pairs discretely described the averaged of 5 abdominal wall-jittered two-way profiles over a radial extent of 1.2 cm. The discrete radial summation of the average profiles was defined by 499 radial position-summation value $(r_j, s_j)$ pairs, where each $s_j$ was defined by $$s_j = \pi \sum_{i=1}^{j} [(r_i^2 - r_{i-1}^2) \times (m_i + m_{i-1})/2]$$

The first term in the summation involves the $(r_o, m_o)$ on-axis magnitude value.

The resulting radial summation or integration profiles are shown in FIG. 14b. In FIG. 14b, the integration profiles for the 2 MHz fundamentals, the 4 MHz second harmonics and the 4 MHz fundamentals are shown at 160a, 160b and 160c respectively. Each of these integrated two-way profiles was scaled such that the value at an off-axis radial distance of 1.2 cm was unity. The elevated sidelobes of the 2 and 4 MHz fundamental profiles cause their summation profiles to rise significantly beyond the radial extent of the mainlobe. This additional rise represents the potential for scattering from the sidelobes to significantly reduce the contrast resolution of the image. In Table 3 the radial extent at which these integration profiles reach the 0.9 level is given. This radial extent is a measure of the sidelobe's potential to reduce the contrast resolution of an image. In this case, the second harmonic's radial extent is 38% less than that of it's 2 MHz fundamental and 63% less than the corresponding 4 MHz fundamental radial extent.

Alternatively, the summation profiles depicted in FIG. 14b offer the percent of the two-way field's amplitude inside or outside a given radius. For example, 91.7% of the 2 MHz fundamental's amplitude, 96.7% of the 4 MHz second harmonic's amplitude, and 88.6% of the 4 MHz fundamental's amplitude fall inside a radius of 0.25 cm. The corresponding percentages falling outside of 0.25 cm are 8.3%, 3.3% and 11.4%, respectively. Ratios of these outside percentages could be useful for inferring the relative contrasts offered in imaging a low scattering or void region of a given size. For a void region approximately 0.5 cm across, the 4 MHz second harmonic of this device might then provide 2.5 times (8 dB) higher contrast than the 2 MHz fundamental and 3.5 times (11 dB) higher contrast than the corresponding 4 MHz fundamental.

Figure 15A:
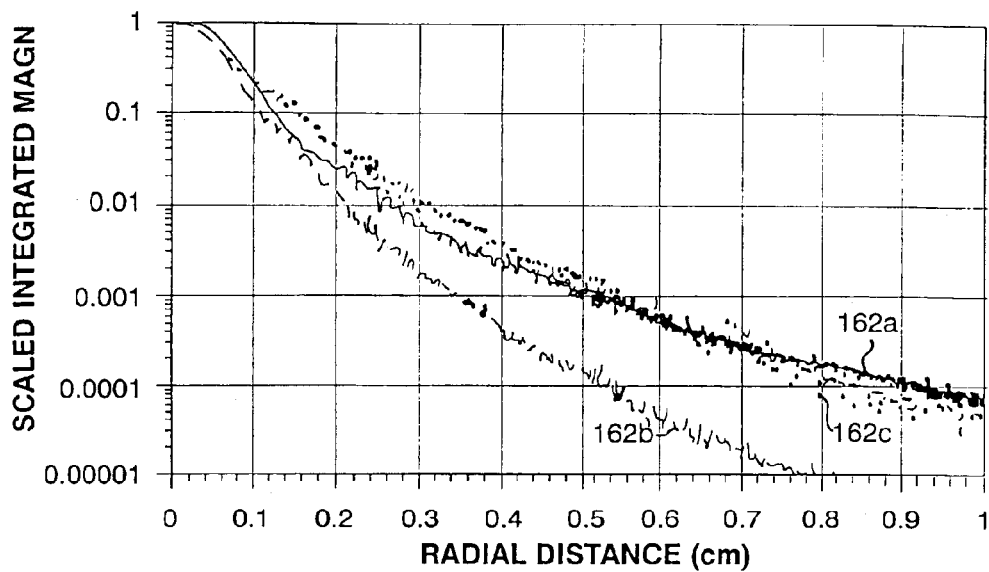
FIGS. 15a and 15b show normalized two-way averaged radial results from five abdominal wall-jittered propagations for the 4 MHz fundamentals, the 8 MHz second harmonics and the 8 MHz fundamentals, and the corresponding radially integrated normalized magnitudes.
Figure 15B:
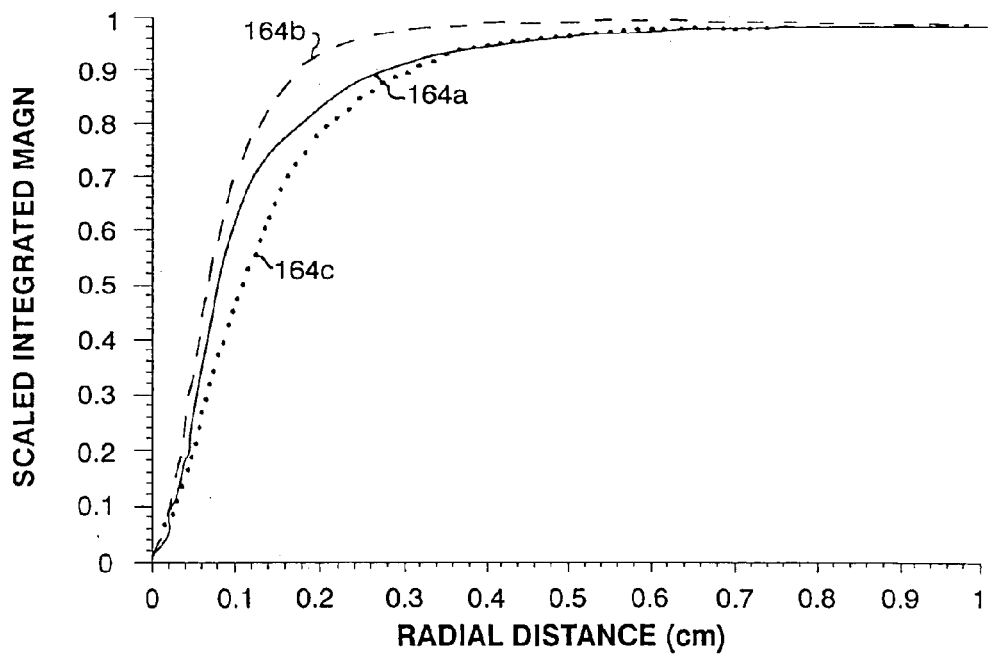

The previous two sets (at 2 and 4 MHz) of 5 abdominal wall-jittered propagations were repeated at twice the source frequencies. FIGS. 15a and 15b depict the corresponding averaged results from these 4 MHz nonlinear and 8 MHz linear propagations. In FIG. 15a the radial average amplitude curves obtained by averaging the 5 two-way data sets are shown. FIG. 15a shows that the 8 MHz fundamental mainbeam 162c is broader than the corresponding 4 MHz fundamental mainbeam 162a. The jitter-imposed lateral resolution limits have been encountered and in fact exceeded at this point. Also note that the 8 MHz second harmonic mainbeam 162b is narrower than either of the fundamentals 162a and 162c. FIG. 15b depicts the additional sidelobe corruption of the fundamental beams and the corresponding increase in the second harmonic's relative contrast resolution potential.

Figure 16A:
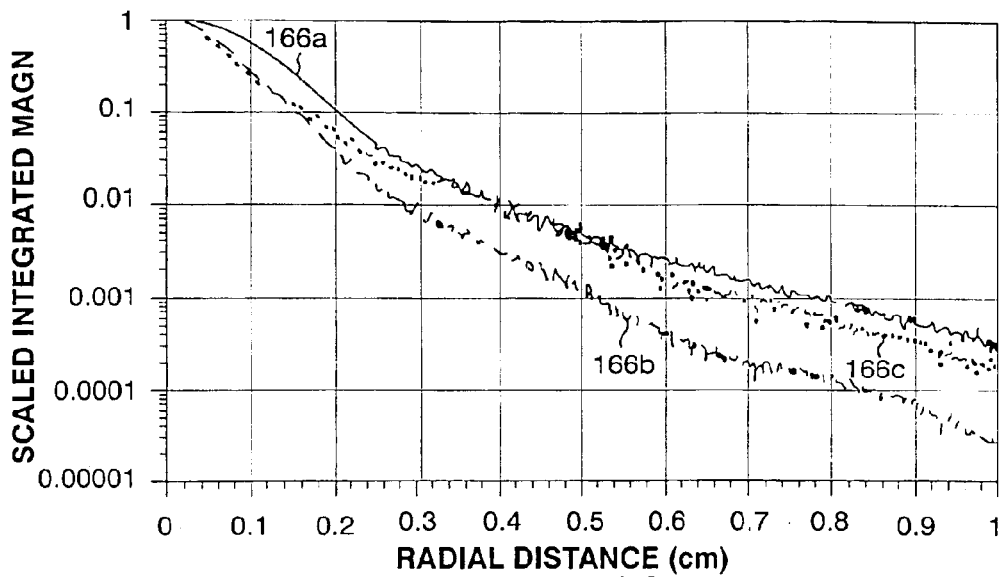
FIGS. 16a and 16b show normalized two-way averaged radial results from five breast jittered propagations for the 2 MHz fundamentals, the 4 MHz second harmonics and the 4 MHz fundamentals, and the corresponding radially integrated magnitudes.
Figure 16B:
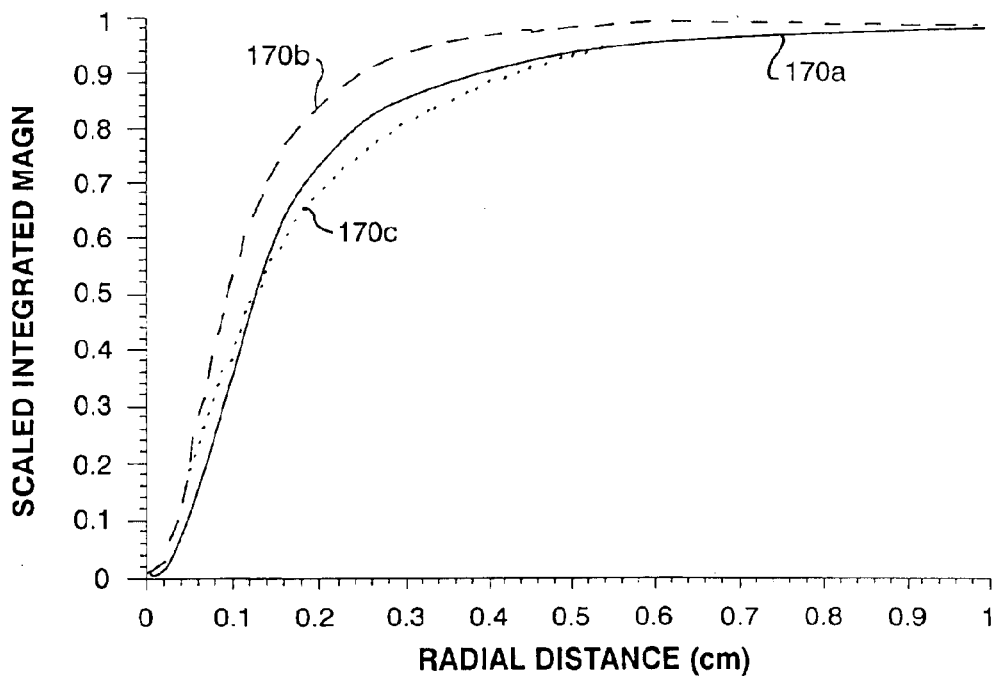

FIGS. 16a, and 16b show average results from 5 propagations through breast wall delay data. The normalized two-way average radii for the 2 MHz fundamentals, the 4 MHz second harmonics and the 4 MHz fundamentals are shown at 166a, 166b and 166c respectively in FIG. 16a; and the corresponding radially integrated magnitudes are shown at 170a, 170b and 170c respectively in FIG. 16b.

In FIGS. 16a and 16b the results considered were from 2 MHz nonlinear and 4 MHz linear propagations. In FIG. 16a, the 4 MHz mainbeams 166c are significantly broadened over the corresponding abdominal wall-jittered mainbeams in FIG. 14a. The sidelobe levels in FIG. 16a are also higher than those in FIG. 14a. These Figures show that the breast wall layers produced significantly more distortion than the abdominal wall layers. The second harmonic 4 MHz profile 166b is 8.4% narrower at the −20 dB level than the fundamental 4 MHz 166c. In FIG. 16b the integrated profile of the second harmonic 170b has a radial extent at the 0.9 level which is 48% less than the 2 MHz fundamental's 170a and 70% less than the 4 MHz fundamental's 170c. Thus, in the more distorting breast wall-jittered propagations, the relative advantages of the 4 MHz second harmonic were larger than in the abdominal wall propagations and includes a slightly narrower mainbeam. The 4 and 8 MHz results for breast wall-jittered propagations follow closely the developments seen in the 4 and 8 MHz curves of FIGS. 16a and 16b. Results from these propagations are included in Table 3 of FIG. 17.

Finally, in all of the jittered propagations considered, the second harmonic mainbeam was narrower than the fundamental mainbeam. The limits on the lateral resolution of the linear harmonics eventually put limits on the second and other higher harmonics, though.

The above discussions show the liver-path beam patterns for a focused Gaussian-apodized transducer operating at 2, 4 and 8 MHz. The non-phase aberrated propagations show that the second and higher harmonics formed through finite amplitude distortion have much lower sidelobe levels than their fundamental harmonic or the corresponding linear fundamentals. The finite amplitude production of these higher harmonic beams allow this sidelobe relationship to hold for any focused or unfocused transducer. Pulse propagation analysis shows that the higher harmonics formed in a propagating pulse-beam can be very well described by considering the harmonics produced in the corresponding continuous wave propagation. Modeling results also show that second harmonic levels sufficient for imaging purposes can be easily obtained within the field amplitude limits of the mechanical index.

The introduction of phase jitter as computed from measured propagation delays from slices of abdominal wall and breast wall causes the sidelobe levels of the second harmonic and fundamental beams to rise significantly. In all of the aberrated propagations considered, the two-way profile of the second harmonic offered narrower −20 dB mainlobe widths and lower sidelobe levels than the fundamental beam which produced it. These same second harmonic profiles had slightly broader mainlobes at 4 MHz in abdominal wall-jitter propagations than the 4 MHz fundamental profiles. In all other jittered propagations considered, though, the second harmonic offered slightly narrower mainlobes than the same-frequency fundamental and substantially lower sidelobe levels. Thus, second harmonic-based ultrasonic images offer significant improvement in the lateral component of contrast resolution.

Figure 18A:
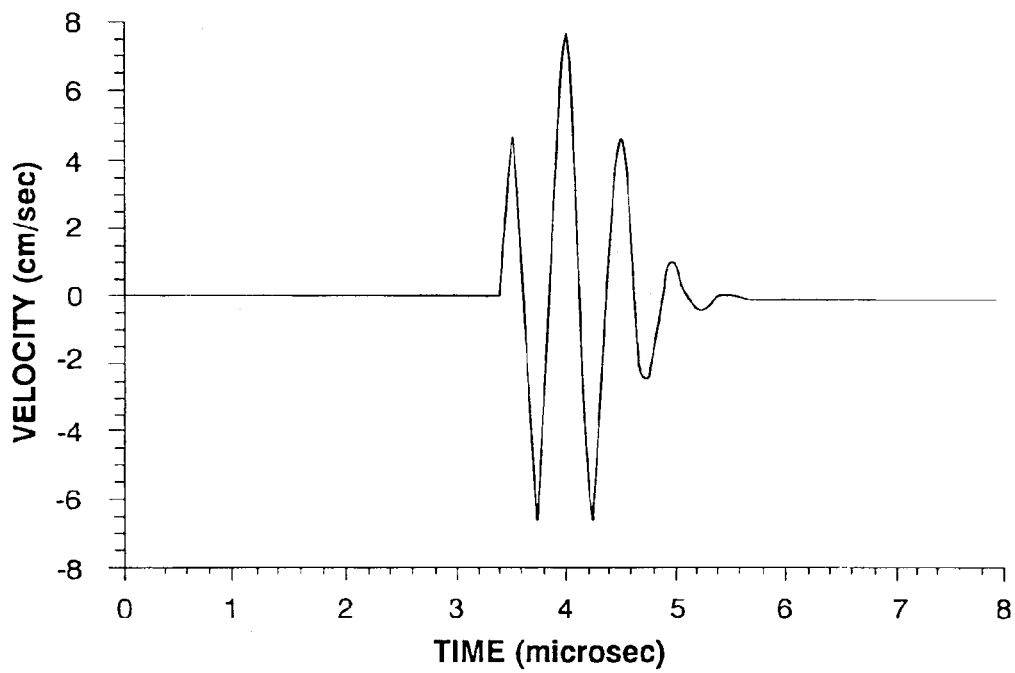
FIGS. 18a–18d show an imperfect source pulse, linearly-scaled and log-scaled focal spectrums of that pulse, and the corresponding nonlinear distortion pulse obtained by constructing with the spectral information in FIG. 18c.
Figure 18B:
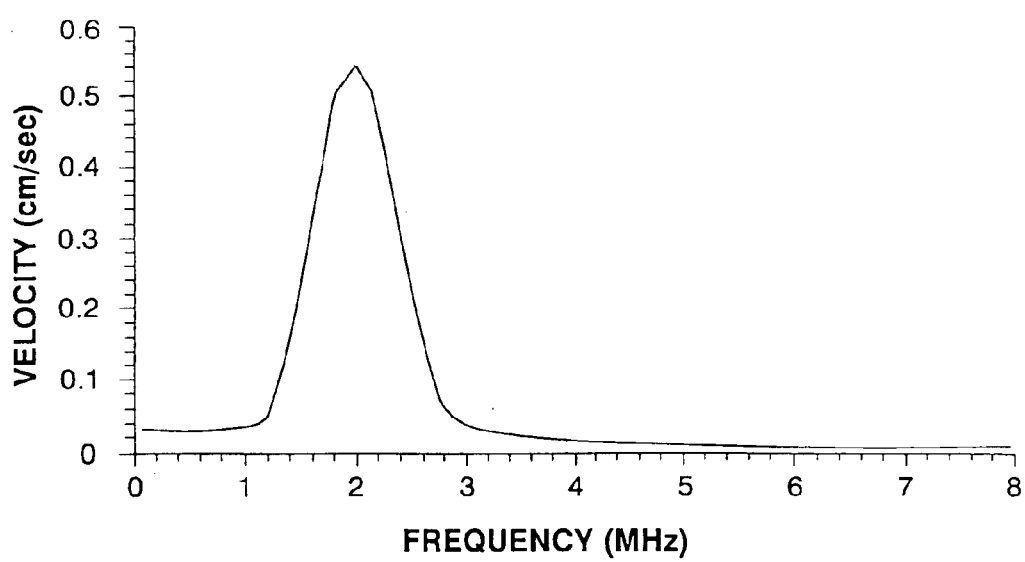
Figure 18C:
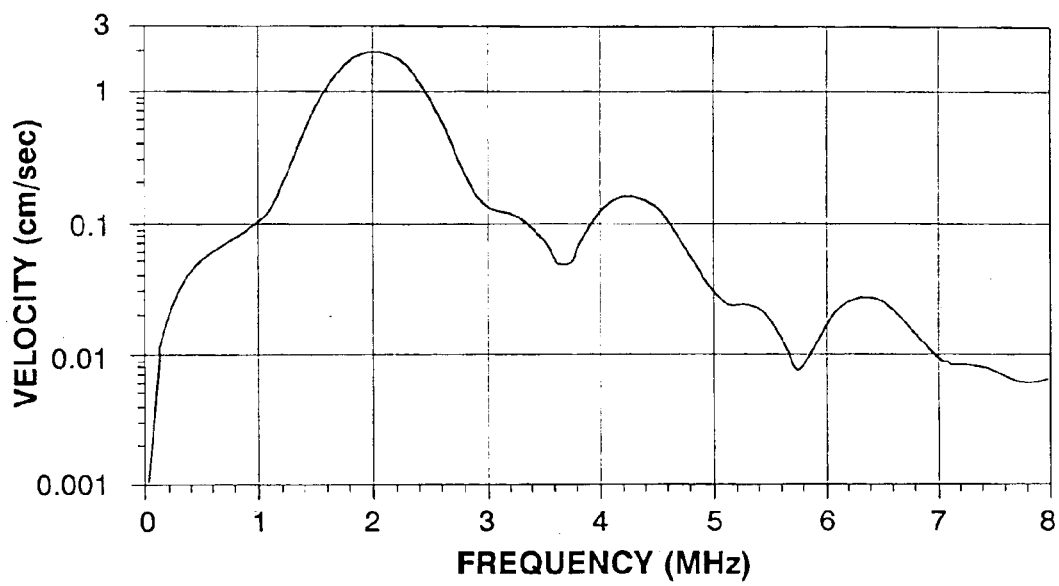

One obstacle to obtaining such images are artifacts from source contributions to the higher harmonic bandwidths. FIG. 18a depicts such as imperfect source wave. This on-axis waveform is depicted in particle velocity units and corresponds to a peak pressure of one half of that of the pulse shown in FIG. 6a. The pulse in FIG. 18a has the same form as that in FIG. 6a with the exception of the initial zero portion. In FIG. 18b, the corresponding source pulse spectrum is shown. Significant energy content outside the 2 MHz bandwidth is visible. The resulting computed focal waveform's spectrum is depicted in FIG. 18c and can be compared to the earlier focal spectrum in FIG. 6b. The log-scaled depiction in FIG. 18c shows that a simple high pass filtering of the received spectrum contains significant contributions from the source.

Figure 18D:
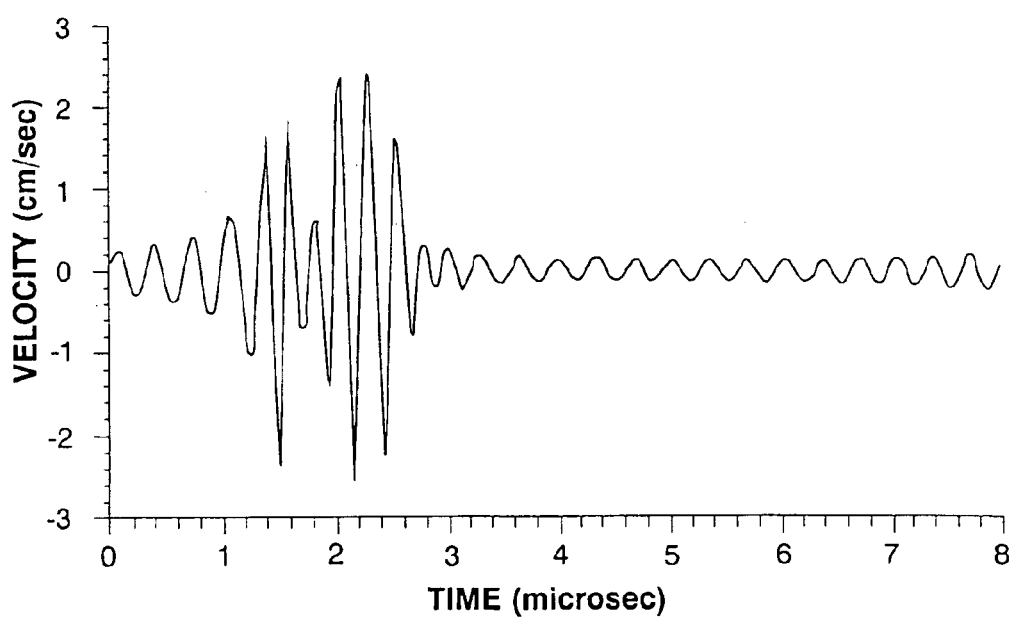

In FIG. 18d, the resulting nonlinear distortion pulse obtained by high pass filtering the spectrum of FIG. 18c is shown. This pulse can be compared to the corresponding distortion pulse shown in FIG. 6c. In both cases, the cut-off frequency was 3 MHz. In FIG. 18d the full 8 microsecond period of the computed pulse is shown so that the ringing associated with the linear or source content within the second harmonic bandwidth can be seen. This ringing could adversely affect the axial component of the contrast resolution and the lateral gains associated with the lower sidelobe levels. In this case, improvements can be obtained by increasing the source amplitude so as to boost the second harmonic bandwidth levels.

A two pulse scheme may be used to alleviate or to eliminate such problems. In this method, two source pulses are sent in place of a single pulse in the image formation cycle. The two pulses are identical in form but one is significantly lower in amplitude. The received echo from this lower amplitude pulse is then used to remove the linear content from the high amplitude pulse. This is accomplished by subtracting an appropriately-scaled version of the received low amplitude signal from the corresponding high amplitude signal. The resulting difference signal may then be high-pass filtered followed by the normal sequence of image formation steps. The high-pass filtering is preferred since pulse analysis has revealed that the low frequency content of the difference signal is radially wide-spread and reduces the higher harmonic sidelobe advantage.

Figure 19A:
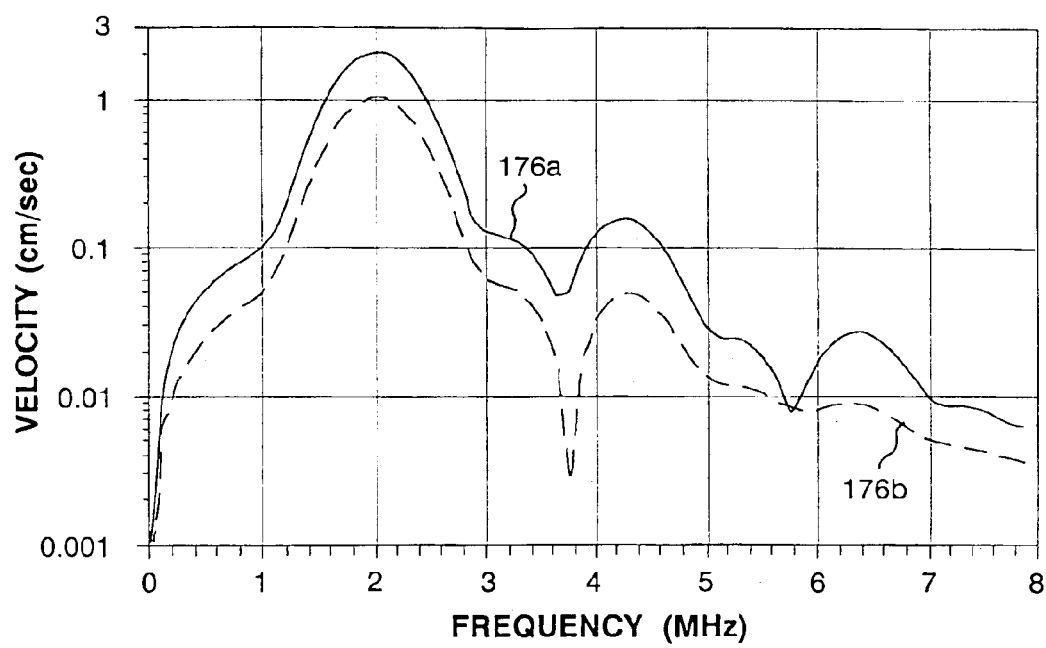
FIG. 19a shows the log-scaled focal spectrum of FIG. 19c overlaid with the focal spectrum from the same source using a half amplitude version of the source pulse, as depicted in FIG. 19c.
Figure 19B:
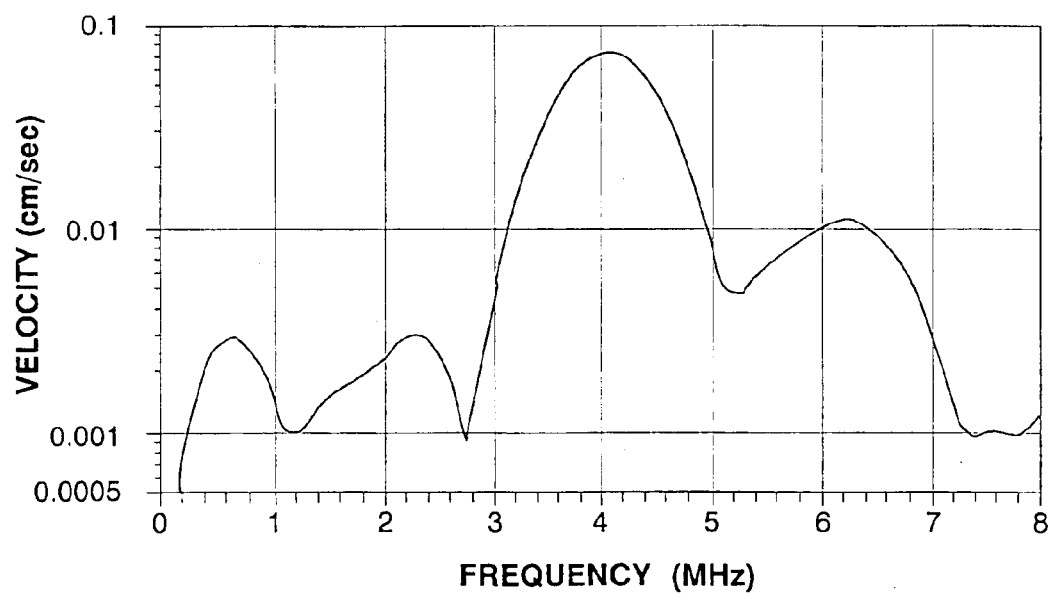
Figure 19C:
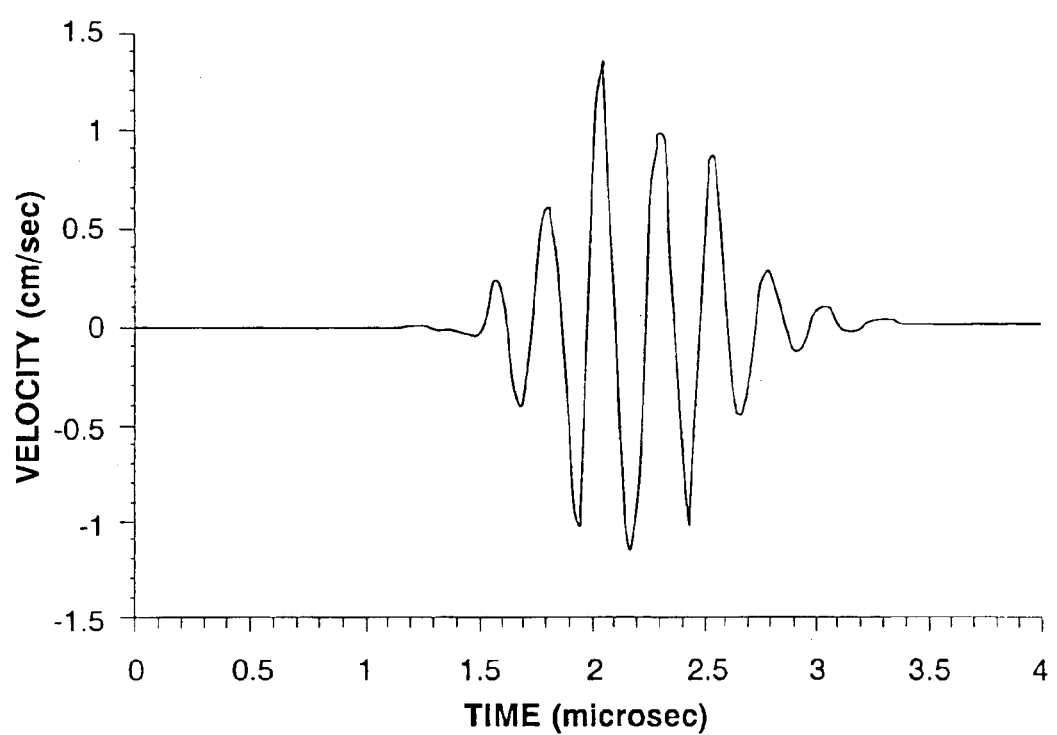
FIG. 19c shows the corresponding nonlinear distortion pulse obtained by constructing with the spectral information in FIG. 19b and starting at 2.75 MHz.

FIGS. 19a, 19b and 19c show results relevant to an implementation of the two pulse scheme using the pulse shown in FIG. 19a as the high amplitude source pulse. In FIG. 19a, the focal spectrum from FIG. 18c is shown at 176a and is overlaid with the focal spectrum 176b produced by a half-amplitude version of the same source. The low or half amplitude spectrum was multiplied by two and subtracted from the high amplitude spectrum to obtain the difference spectrum depicted in FIG. 19b. Note that if the propagations had not involved finite amplitude distortion, then this difference spectrum would have been all zero. The difference spectrum was then high pass filtered and inverse transformed to obtain the effective on-axis distortion imaging pulse shown in FIG. 19c. The transition for the high pass filtering was at 2.75 MHz. This same frequency was also appropriate for filtering off-axis difference spectra.

This two pulse scheme appears to be capable of extracting the desired largely-second harmonic images from any realistic ultrasonic imaging pulse. The third harmonic bandwidth depicted in FIG. 19b, though, does not appear to be separable from the second harmonic bandwidth. The nodal depth between these harmonics is not deep enough. Thus, third harmonic (or largely-third harmonic) images do not appear to be easily obtainable with this two pulse scheme. Also, a two pulse scheme with a ¹⁄₄₀₀₀ second interval between the respective high and low amplitude source pulses, does not have significant artifacts due to tissue or transducer motion.

The use of the second harmonic (plus a small contribution from higher harmonics) to form an image is an independent alternative to the phase correction-based schemes which have been and are being examined by other investigators as a means for improving the contrast performance of biomedical ultrasonic imaging.

The higher harmonics also offer additional opportunities for correcting for beam distortion. The amplitude of the third harmonics in the focal region is strongly affected by the fundamental's amplitude. As discussed above, the nonlinear production of the third harmonic is proportional to the product of the amplitudes of the fundamental and second harmonics. This means that much of the third harmonic's production occurs in the focal region where beam distortion can reduce the amplitude of the fundamental and second harmonic. Thus, an iterative scheme may be used to correct for beam defocusing using the amplitude of the received third harmonic for feedback.

Second harmonic images also provide for a means of reducing speckle. In particular, an image formed as the sum of a second harmonic image and the corresponding fundamental image would have less speckle than either of the constituent images. Since the second harmonic is twice the frequency of the fundamental and has a largely constant phase relationship with the fundamental in the mainlobe, the second harmonics images's speckle pattern would be conveniently out of phase with that of the fundamental.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method of imaging a biological sample, comprising the steps of:

generating a transmit ultrasonic signal at a fundamental frequency;

directing the transmit signal into and along a propagation path in the sample, wherein the sample distorts the transmit signal along the propagation path and thereby produces a distorted ultrasonic signal including harmonic components at second and higher order harmonic frequencies of the fundamental frequency, and further wherein the sample also reflects the distorted ultrasonic signal including said harmonic components;

receiving the harmonic components of the reflected distorted ultrasonic signal;

digitizing the received signal;

using a processor to process the digitized signal to produce an image principally from one of the received harmonic components of the reflected distorted ultrasonic signal; and displaying said produced image.

2. A method according to claim 1, wherein the sample has a near field and a focal plane, and wherein the amplitude of the second harmonic component of the distorted ultrasonic signal exhibits a relatively large gain in growth from low near field values to significant focal plane amplitudes.

3. A method according to claim 2, wherein the sample has a source plane, and as the transmit signal propagates to the focal plane, the amplitude of said second harmonic component of the produced, distorted signal at half the distance between the source and focal planes is about twice the amplitude of said second harmonic component at the source plane.

4. A method according to claim 3, further comprising the step of high pass filtering the received harmonic components of the reflected, distorted ultrasonic signal.

5. A method according to claim 4, wherein the high pass filtering step occurs before the digitizing step.

6. A method according to claim 1, wherein said sample causes defocusing effects in said near field, and because of said relatively large gain in growth of the amplitude of the second harmonic component between the near field and the focal plane, only a fraction of said second harmonic component is defocused by said near field defocusing effects.

7. A method according to claim 1, wherein:

the generating step includes the step of using a phased array transducer-receiver unit to generate the transmit signal; and the directing step includes the steps of:
i) using the transducer-receiver unit to focus the transmit signal on a focal point in the sample, and
ii) using electrical circuitry in the transducer-receiver unit to move the focal point around the sample.

8. A method of imaging a biological sample, comprising the steps of:
- generating first and second ultrasonic transmit pulse signals at a fundamental frequency;
- directing the first and second pulse signals into and along a propagation path in the sample, wherein the sample distorts the first and second pulse signals along the propagation path and thereby produces, respectively, first and second distorted ultrasonic signals including harmonic components at second and higher order harmonic frequencies of the fundamental frequency, and further wherein the sample also reflects the first and second distorted ultrasonic signals including said harmonic components therein;
- receiving the harmonic components of the reflected first and second distorted ultrasonic signals;
- digitizing the received first and second signals;
- scaling the digital values obtained from the first signal;
- subtracting the scaled digital values obtained from the first signal from the second signal to produce a resultant signal;
- using a processor to process said resultant signal to produce an image principally from the received harmonic components of the reflected distorted ultrasonic signals; and
- displaying said produced image.

9. A method according to claim 8, wherein the resultant signal is high pass filtered and transformed to a time domain to obtain an on-axis distortion imaging pulse.

10. A method according to claim 8, wherein the sample has a near field and a focal plane, and wherein the amplitudes of the second harmonic components of the distorted ultrasonic signals exhibit relatively large gains in growth from low near field values to significant focal plane amplitudes.

11. A method according to claim 10, wherein the sample has a source plane, and as the transmit pulse signals propagate to the focal plane, the amplitudes of said second harmonic components of the produced, distorted signals at half the distance between the source and focal planes is about twice the amplitudes of said second harmonic components at the source plane.

12. A method according to claim 10, wherein said sample causes defocusing effects in said near field, and because of said relatively large gains in growth of the amplitudes of the second harmonic components between the near field and the focal plane, only a fraction of said second harmonic components are defocused by said near field defocusing effects.

13. A method according to claim 8, wherein:
- the generating step includes the step of using a phased array transducer-receiver unit to generate the transmit signals; and
- the directing step includes the steps of:
  i) using the transducer-receiver unit to focus the transmit signals on a focal point in the sample; and
  ii) using electrical circuitry in the transducer-receiver unit to move the focal point around the sample.

14. A system for imaging a biological sample, comprising:
- means for generating a transmit ultrasonic signal at a fundamental frequency;
- means for directing the transmit signal into and along a propagation path in the sample, wherein the sample distorts the transmit signal along the propagation path and thereby produces a distorted ultrasonic signal including harmonic components at second and higher order harmonic frequencies of the fundamental frequency, and further wherein the sample also reflects the distorted ultrasonic signal including said harmonic components;
- means for receiving the harmonic components of the reflected distorted ultrasonic signal;
- an analog-to-digital converter for digitizing the received signal;
- a processor to process the digitized signal to produce an image principally from one of the received harmonic components of the reflected distorted ultrasonic signal; and
- means for displaying said formed image.

15. A system according to claim 14, wherein the sample has a near field and a focal plane, and wherein the amplitude of the second harmonic component of the distorted ultrasonic signal exhibits a relatively large gain in growth from low near field values to significant focal plane amplitudes.

16. A system according to claim 15, wherein the sample has a source plane, and as the transmit signal propagates to the focal plane, the amplitude of said second harmonic component of the produced, distorted signal at half the distance between the source and focal planes is about twice the amplitude of said second harmonic component at the source plane.

17. A system according to claim 16, wherein said sample causes defocusing effects in said near field, and because of said relatively large gain in growth of the amplitude of the second harmonic component between the near field and the focal plane, only a fraction of said second harmonic component is defocused by said near field defocusing effects.

18. A system according to claim 14, wherein reflected distorted signal also includes frequency components of the fundamental frequency, and further comprising a high pass filter to remove from the received signal the component thereof at the fundamental frequency.

19. A system according to claim 18, wherein the high pass filter removes said fundamental frequency component of the received signal before the signal is digitized by the analog-to-digital converter.

20. A system according to claim 14, wherein:
- the generating means includes a phased array transducer-receiver unit to generate the transmit signal; and
- the transducer-receiver unit focuses the transmit signal on a focal point in the sample, and includes electrical circuitry to move the focal point around the sample.

21. A system for imaging a biological sample, comprising:
- means for generating first and second ultrasonic transmit pulse signals at a fundamental frequency;
- means for directing the first and second pulse signals into and along a propagation path in the sample, wherein the sample distorts the first and second pulse signals along the propagation path and thereby produces, respectively, first and second distorted ultrasonic signals including harmonic components at second and higher order harmonic frequencies of the fundamental frequency, and further wherein the sample also reflects the first and second distorted ultrasonic signals including said harmonic components therein;
- means for receiving the harmonic components of the reflected first and second distorted ultrasonic signals;
- an analog-to-digital converter for digitizing the received first and second signals;
- processor means for scaling the digital values obtained from the first signal, subtracting the scaled digital values obtained from the first signal from the second signal to produce a resultant signal, and to process said resultant signal to produce an image principally from the received harmonic components of the reflected distorted ultrasonic signals; and means for displaying said formed image.

22. A system according to claim 21, wherein the processor means includes a high pass filter to filter the resultant signal, and the processor means transforms the resultant signal to a time domain to obtain an on-axis distortion imaging pulse.

23. A system according to claim 21, wherein the sample has a near field and a focal plane, and wherein the amplitudes of the second harmonic components of the distorted ultrasonic signals exhibit relatively large gains in growth from low near field values to significant focal plane amplitudes.

24. A system according to claim 23, wherein the sample has a source plane, and as the transmit pulse signals propagate to the focal plane, the amplitudes of said second harmonic components of the produced, distorted signals at half the distance between the source and focal planes is about twice the amplitudes of said second harmonic components at the source plane.

25. A system according to claim 23, wherein said sample causes defocusing effects in said near field, and because of said relatively large gains in growth of the amplitudes of the second harmonic components between the near field and the focal plane, only a fraction of said second harmonic components are defocused by said near field defocusing effects.

26. A system according to claim 21, wherein:

the generating means includes a phased array transducer-receiver unit to generate the transmit signals; and the transducer-receiver unit focuses the transmit signals on a focal point in the sample, and includes electrical circuitry to move the focal point around the sample.

* * * * *